(12) United States Patent
Shetye et al.

(10) Patent No.: US 10,027,671 B2
(45) Date of Patent: Jul. 17, 2018

(54) RESTRICTING ACCESS TO CONTENT BASED ON A POSTERIOR PROBABILITY THAT A TERMINAL SIGNATURE WAS RECEIVED FROM A PREVIOUSLY UNSEEN COMPUTER TERMINAL

(71) Applicant: CA, Inc., New York, NY (US)

(72) Inventors: Atmaram Shetye, Mapusa (IN); Himanshu Ashiya, Bangalore (IN)

(73) Assignee: CA, Inc., New York, NY (US)

( * ) Notice: Subject to any disclaimer, the term of this patent is extended or adjusted under 35 U.S.C. 154(b) by 166 days.

(21) Appl. No.: 15/184,493

(22) Filed: Jun. 16, 2016

(65) Prior Publication Data

US 2017/0366553 A1 Dec. 21, 2017

(51) Int. Cl.
*H04L 29/06* (2006.01)
*G06N 7/00* (2006.01)
*H04L 29/08* (2006.01)

(52) U.S. Cl.
CPC .......... *H04L 63/101* (2013.01); *G06N 7/005* (2013.01); *H04L 67/2842* (2013.01)

(58) Field of Classification Search
CPC .... G06N 7/005; H04L 63/0876; H04L 63/102
See application file for complete search history.

(56) References Cited

U.S. PATENT DOCUMENTS

| | | | | |
|---|---|---|---|---|
| 9,052,931 B2 * | 6/2015 | Sama | ................. | G06F 21/00 |
| 9,355,155 B1 * | 5/2016 | Cassel | ................. | G06F 21/552 |
| 9,686,276 B2 * | 6/2017 | Grigorovici | ........ | H04L 63/0876 |
| 2006/0053123 A1 * | 3/2006 | Ide | .................... | G06F 17/30705 |
| 2009/0222243 A1 * | 9/2009 | Zoldi | .................... | G06Q 10/04 |
| | | | | 703/2 |

(Continued)

OTHER PUBLICATIONS

Jahanirad et al., "Blind source mobile device identification based on recorded call", *Engineering Applications of Artificial Intelligence*, vol. 36, Nov. 2014, pp. 320-331.

(Continued)

*Primary Examiner* — Izunna Okeke
*Assistant Examiner* — Hee K Song
(74) *Attorney, Agent, or Firm* — Sage Patent Group

(57) ABSTRACT

A method by a content server includes maintaining a historical repository of terminal signature tuples received from computer terminals. Each of the terminal signature tuples contains a terminal identifier for a computer terminal and a terminal signature characterizing a measured operation by the computer terminal. An access request message is received from a source computer terminal and contains a terminal signature tuple. The terminal signature tuple in the access request message contains a terminal identifier for the source computer terminal and a terminal signature characterizing a measured operation by the source computer terminal. A posterior probability value is generated based on processing a combination of the terminal signature tuple contained in the access request message and the terminal signature tuples contained in the historical repository. The content server controls access for the access request message to a resource controlled by the content server based on the posterior probability value.

19 Claims, 10 Drawing Sheets

(56) References Cited

U.S. PATENT DOCUMENTS

| | | | | |
|---|---|---|---|---|
| 2010/0228625 | A1* | 9/2010 | Priyadarshan | G06Q 30/02 705/14.49 |
| 2011/0099480 | A1* | 4/2011 | Sama | G06F 21/00 715/736 |
| 2013/0242795 | A1* | 9/2013 | Heen | H04L 63/1425 370/252 |
| 2014/0313983 | A1* | 10/2014 | Onno | H04L 63/105 370/328 |
| 2015/0081431 | A1* | 3/2015 | Akahoshi | G06Q 30/0254 705/14.52 |
| 2015/0282755 | A1* | 10/2015 | Deriche | A61B 5/4094 600/301 |
| 2015/0339583 | A1* | 11/2015 | McQueen | H04L 51/12 706/12 |
| 2017/0243223 | A1* | 8/2017 | Kolotinsky | G06F 3/0484 |

OTHER PUBLICATIONS

Kim et al., "Poisson Naive Bayes for Text Classification with Feature Weighting", *Proceedings of the Sixth International Workshop on Information Retrieval With Asian Languages* (*IRAL 2003*), Sappro, Japan, Jul. 7, 2003, pp. 33-40.

\* cited by examiner

RESTRICTING ACCESS TO CONTENT BASED ON A POSTERIOR PROBABILITY THAT A TERMINAL SIGNATURE WAS RECEIVED FROM A PREVIOUSLY UNSEEN COMPUTER TERMINAL

BACKGROUND

The present disclosure relates to controlling communications between computer terminals, and more particularly to controlling access attempts by multiple computer terminals to protected content.

Users can desire to access network accessible content from many different computer terminals, such as desktop computers, laptop computers, tablet computers, mobile phones, game consoles, media players, etc. At times, a user may attempt to simultaneously access content from more than one computer terminal. Typically, the user is permitted by a network accessible content server to have unrestricted access to the content from any computer terminal after successfully completing authentication of credentials provided by the user and determining that the user is authorized to access the content.

SUMMARY

Some embodiments disclosed herein are directed to a method of performing operations on a processor of a content server. The method includes maintaining in a memory device a historical repository of terminal signature tuples received from a plurality of computer terminals. Each of the terminal signature tuples contains a terminal identifier for a computer terminal and a terminal signature characterizing a measured operation by the computer terminal. An access request message is received through a network interface circuit from a source computer terminal. The access request message contains a terminal signature tuple. The terminal signature tuple in the access request message contains a terminal identifier for the source computer terminal and a terminal signature characterizing a measured operation by the source computer terminal. A posterior probability value is generated based on processing a combination of the terminal signature tuple contained in the access request message and the terminal signature tuples contained in the historical repository. The content server controls whether access is granted for the access request message to access a resource controlled by the content server based on the posterior probability value.

Some other embodiments disclosed herein are directed to a content server that includes a network interface circuit, a processor circuit coupled to the network interface, and a memory circuit. The network interface circuit is configured to communicate with computer terminals. The memory circuit is coupled to the processor circuit and stores program code which when executed by the processor causes the processor to perform operations. The operations include maintaining in a memory device a historical repository of terminal signature tuples received from a plurality of computer terminals. Each of the terminal signature tuples contains a terminal identifier for a computer terminal and a terminal signature characterizing a measured operation by the computer terminal. An access request message is received through a network interface circuit from a source computer terminal. The access request message contains a terminal signature tuple. The terminal signature tuple in the access request message contains a terminal identifier for the source computer terminal and a terminal signature characterizing a measured operation by the source computer terminal. A posterior probability value is generated based on processing a combination of the terminal signature tuple contained in the access request message and the terminal signature tuples contained in the historical repository. The content server controls whether access is granted for the access request message to access a resource controlled by the content server based on the posterior probability value.

Some content owners would find it desirable to restrict some content, such as documents containing confidential information or copyrighted works, to being accessible to only authorized users while operating authorized computer terminals. The authorized computer terminals may be allowed access because they are determined to be more secure by design and/or trusted because of a known relationship to authorized users. For example, an authorized computer terminal may be provided by an employer or may be provided by a user who has registered the computer terminal for use in accessing the content. Such content owners would need a way to allow the content to be accessible only from computer terminals having a confirmed identity. However, fraudsters have developed sophisticated techniques to obtain credentials of users who are authorized to access content. Some of these fraudsters have moreover developed sophisticated techniques to cause computer terminals operated by the fraudsters to impersonate another computer terminal operated by an authorized user.

Other methods, content servers, and systems according to embodiments will be or become apparent to one with skill in the art upon review of the following drawings and detailed description. It is intended that all such additional methods, content servers, and systems be included within this description and protected by the accompanying claims.

BRIEF DESCRIPTION OF THE DRAWINGS

Aspects of the present disclosure are illustrated by way of example and are not limited by the accompanying drawings. In the drawings.

DETAILED DESCRIPTION

Figure 1:
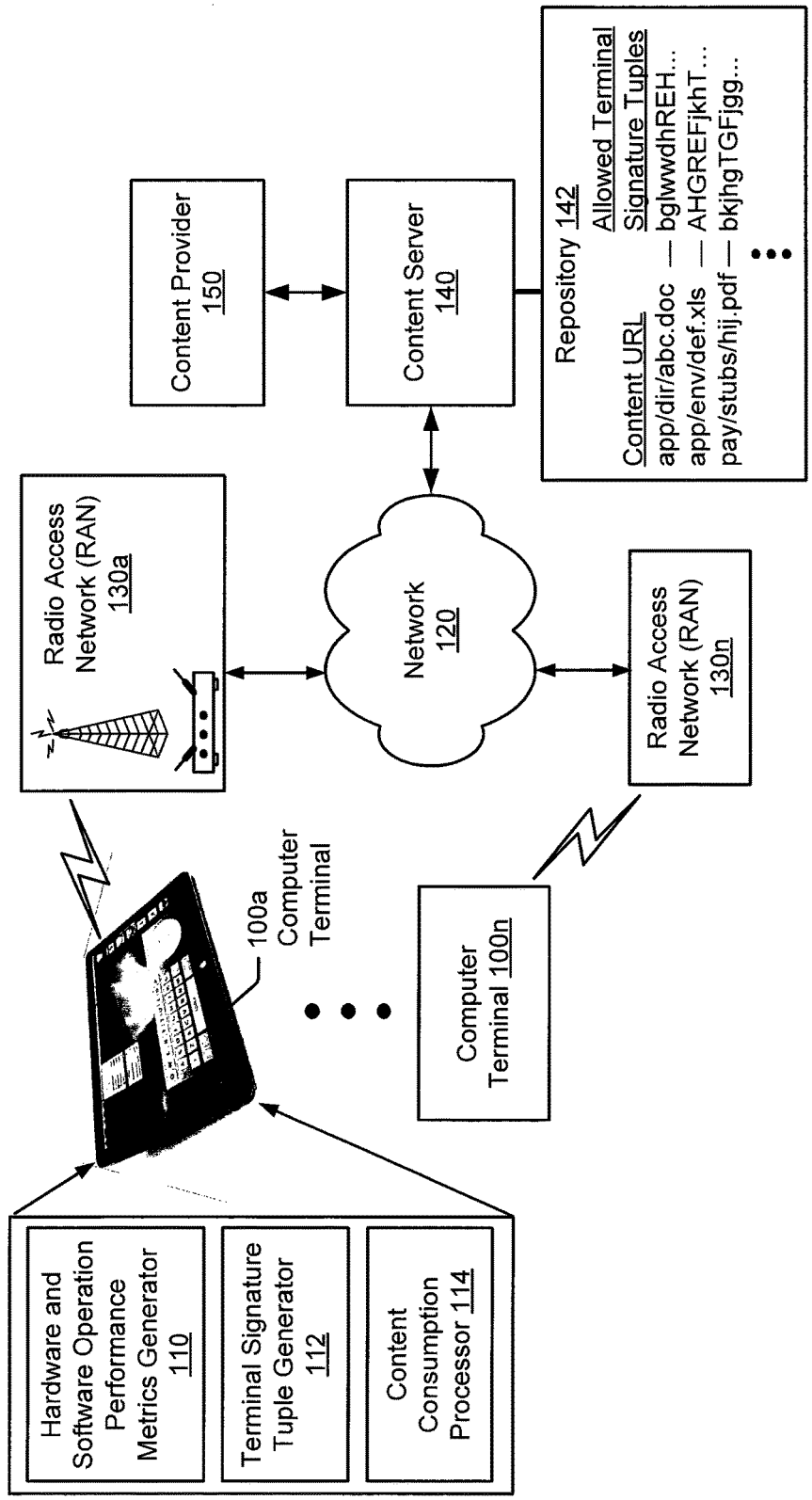
FIG. 1 is a block diagram of a system for restricting access to content available through a content server based on terminal signature tuples, which have been generated based on measurements of terminal operational performance metrics, and based on related determinations of the probability that the terminal signature tuples have been previously received, in accordance with some embodiments of the present disclosure.

Various embodiments will be described more fully hereinafter with reference to the accompanying drawings. Other embodiments may take many different forms and should not be construed as limited to the embodiments set forth herein. Like numbers refer to like elements throughout.

Various embodiments of the present disclosure are directed to measuring certain defined hardware operations and/or software operations performed by the computer terminal to generate operational performance metrics, and using the operational performance metrics to generate a terminal signature tuple that identifies the computer terminal. The terminal signature tuple is communicated to the content server in an access request when the computer terminal is seeking access to content that is available through the content server. The content server restricts access to the content based on its determination of a probability that the terminal signature tuple has been previously received.

As will be explained in further detail below, in one embodiment the terminal signature tuple contains a plurality of hardware operational performance metrics, which can include: measurements of elapsed time for processor of the computer terminal to read data from ranges of buffer addresses within a hierarchical cache memory; measurements of processor speed; measurements of operation system speed scaling gain used to transform mouse movement data into mouse speed data; measurements of user terminal failed memory bytes; measurements of failed display pixels; measurements of network latency; measurements of network speed; measurements of power-on time; and/or other hardware operational performance metrics and, furthermore, may contain metrics based on software operational performance. Some or all of the hardware operational performance metrics and/or software operational performance metrics may change over time, resulting in differences in the signature tuples generated therefrom for the same computer terminal.

Some embodiments of the present disclosure are directed to operations and methods by a content server to determine trustworthiness of a computer terminal based on its determination of a probability that the terminal signature tuple that is presently received from the computer terminal has been previously received, in spite of differences that can occur in the signature tuples received from that computer terminal. In this manner, a myriad of different operational performance metrics can be used to generate a terminal signature tuple which is used to identify a computer terminal and control access by the computer terminal to content available through the content server. Moreover, the operations used by the content server to control access by the computer terminal are adaptive to changes that allow the terminal signature tuples to be generated based on operational performance metrics that change over time between content access requests and/or between a registration instance and a subsequent content access request.

Moreover, in contrast to prior art approaches for identifying a computer terminal using cookies stored on the computer terminal, the terminal signature tuples may be generated using intrinsic operational performance characteristics of the computer terminal which cannot be deleted or modified by the user. At least some measurements of the intrinsic operational performance characteristics of the computer terminal are not affected by whether the computer terminal is attempting to access content through a corporate intranet or the public internet.

In one embodiment, a content server is configured to allow content to be shared between users but restricted to being accessed through particular identified computer terminals. During an initial registration process to register a single computer terminal for authorized access to content, a user logs-into an application on the computer terminal to generate a terminal signature tuple for the computer terminal and provide a user identifier that is registered in a repository with a logical association to the terminal signature tuple. The content server can prevent the same user from then accessing the content through the content server from any other computer terminal which has not been granted access to the content.

FIG. 1 is a block diagram of a system for restricting access to content available through a content server 140 based on terminal signature tuples, which have been generated based on measurements by computer terminals 100a-100n of their respective operational performance metrics, and based on related determinations by the content server 140 of the probability that the terminal signature tuples have been previously received, in accordance with some embodiments of the present disclosure.

Referring to FIG. 1, a user may be able to operate each of the computer terminals 100a-100n (individually referred to as computer terminal 100) to attempt to access content through the content server 140 via one or more radio access networks 130a-130n and a data network 120. At times, the user may operate one or more of the computer terminals 100a-100n simultaneously or in tandem to attempt to access the content. The computer terminal 100 may be any electronic computing device that can communicate through one or more communication networks with the content server 140, including, but not limited to, a desktop computer, a laptop computer, a tablet computer, a mobile phone, a game console, a media player, etc.

In accordance with various embodiments disclosed herein, the content server 140 restricts access to the content to allowed terminal signature tuples. In the example of FIG. 1, the computer terminal 100 includes a hardware and software operation performance metrics generator 110, a terminal signature tuple generator 112, and a content consumption processor 114. The generators 110 and 112 may be performed by lightweight code provided by the content server 140 or another provider interface for execution by the computer terminal 100 during an on-line session to collect and transmit user data and metrics data. As will be explained in further detail below, a user can supply a user identifier and password to login to the content consumption processor 114 in order to request access to content available through the content server 140. The user identifier may otherwise be determined by the computer terminal 100 such as using fingerprint authentication operations. The content may reside within the content server 140 and/or may available through the content server 140 from a content provider 150 (e.g., a streaming video subscription operator) and/or may be reside on the computer terminal 100 in a locked format.

Responsive to authenticating the user, the content consumption processor 114 triggers the performance metrics generator 110 to measure one or more different types of hardware operational features of the computer terminal 100 and/or measure one or more different types of software operational features of the computer terminal 100 to generate one or more operational performance metrics. The terminal signature tuple generator 112 generates a terminal signature tuple based on the one or more operational performance metrics. In one embodiment, the generator 112 generates the terminal signature tuple by adding each of the operational performance metrics as separate entries to a data structure.

The content server 140 maintains a repository 142 having data structures that identify content available through the content server 140 and logically associated terminal signature tuples from computer terminals that users are allowed to operate when accessing the content. The illustrated repository 142 contains data structures that list content URL addresses where content items can be accessed through the content server 140, and further list for each of the content URL addresses one or more allowed terminal signature tuples that are allowed to access the identify content URL address. Although the illustrated repository 142 illustrates a one-to-one mapping between any one of the content URL addresses and any one of the terminal signature tuples, the repository 142 is not limited thereto and may map a plurality of content URL addresses to a single allowed terminal signature tuple and/or map a single content URL address to a plurality of allowed terminal signature tuples. More generally, the repository 142 can map any number of content identifiers to any number of terminal signature tuples.

In one non-limiting illustrative example, the terminal signature tuple is generated to include a hierarchical cache latency signature vector, a measured value for CPU speed, values representing a list of fonts available for use by applications on the computer terminal, a value representing a type and/or version of operating system processed by the computer terminal, a value' representing the type of processor of the computer terminal, a value representing a measurement of keyboard delay, a value representing a maximum resolution capability of a display device of the mobile terminal, etc.

Figure 2:
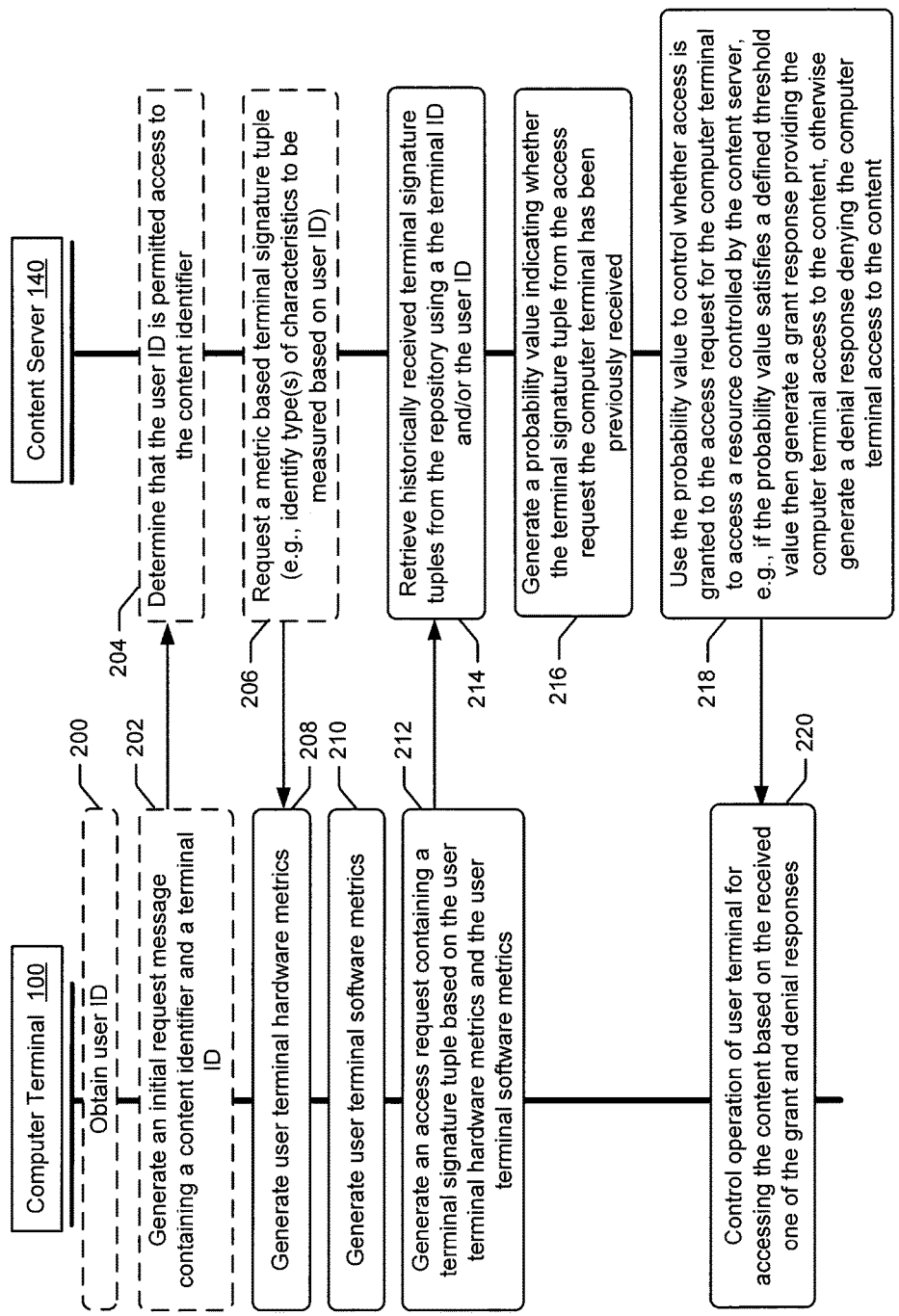
FIG. 2 is a combined data flow diagram and flowchart of operations by a computer terminal and a content server for restricting access to content available through the content server responsive to an access request message containing a terminal signature tuple, which was generated based on measurements of terminal operational performance metrics, and based on a related determination of the probability that the terminal signature tuple has been previously received, in accordance with some embodiments of the present disclosure.

FIG. 2 is a combined data flow diagram and flowchart of operations by a computer terminal 100 and a content server 140 for restricting access to content available through the content server 140 responsive to an access request message containing a terminal signature tuple, which was generated based on measurements of terminal operational performance metrics, and based on a related determination of the probability that the terminal signature tuple has been previously received, in accordance with some embodiments of the present disclosure.

Referring to FIG. 2, during a registration process the computer terminal 100 obtains (block 200) a user identifier for a user operating the computer terminal 100. The computer terminal 100 generates an initial request message containing a content identifier, identifying content that is requested to be accessed through the content server 140, and a terminal identifier (block 202), and communicates the initial request message to the content server 140. The content server 140 determines (block 204) that the user ID is permitted access to the content identifier for content. Responsive to the determination (block 204), the content server 140 communicates (block 206) a terminal signature tuple request message to the computer terminal 100 that requests the computer terminal 100 to generate a terminal signature tuple based on measurement of a present operation performed by the computer terminal 100. The terminal signature tuple request message may identify particular types of hardware metrics and/or software metrics that are to be measured and used by the user terminal 100 and generating the terminal signature tuple.

The computer terminal 100 responsively generates (block 208) one or more hardware performance metrics of the computer terminal 100 based on measurements of various defined order operations of the computer terminal 100. The computer terminal 100 may additionally or alternatively determine (block 210) one or more software metrics of the computer terminal 100.

In one embodiment, the content server 140 can instruct the computer terminal 100 to generate the hardware metrics and/or software metrics based on an identified one or more types of hardware features and/or software features which are selected by the content server 140 based on the user identifier, the terminal identifier, and/or the content identifier received from the computer terminal 100 via the initial request message. In a further example embodiment, the content server 140 uses the user identifier, the terminal identifier, and/or the content identifier contained in the initial request message to select a plural defined number of different types of hardware and/or software features as a subset from among a superset of defined types of hardware and/or software features, which the computer terminal 100 is to measure and use when generating the terminal signature tuple. The type and/or number of types of features selected by the content server 140 may be determined based on a level of security defined by a security policy for the user identifier and/or the content identifier.

The content server 140 can perform the selection of which hardware and/or software features are to be measured to generate the metrics, based on information recorded in the repository 142 that identifies which types of features were earlier used by the computer terminal 100 when generating one or more terminal signature tuples that has been stored in the repository 142 during a terminal registration process and/or during an earlier request for access to content. The content server 140 can provide such instructions to the computer terminal 100 as content in the terminal signature tuple request message, and can record information in the repository 142 which identifies which types of hardware features and/or software features are used by the computer terminal 100 to generate the terminal metric identifier. Example hardware features and/or software features that can be measured or determined by the computer terminal 100 to generate corresponding metrics are explained in further detail herein, including with respect to FIG. 3.

The computer terminal 100 generates (block 212) the terminal signature tuple to include the generated computer terminal hardware metrics and the generated computer terminal software metrics. The computer terminal 100 may, for example, generate the terminal signature tuple based on a mathematical combination of between tens of different defined types and thousands of different defined types of hardware and/or software metrics. The computer terminal 100 further generates (block 212) generates an access request containing the terminal signature tuple, which is communicated to the content server 140. The content server 140 retrieves (block 214) historically receive terminal signature tuples from the repository 142 in a memory using the terminal identifier and/or the user identifier.

The content server 140 generates (block 216) a posterior probability value that indicates a likelihood of whether the terminal signature tuple contained in the access request from the computer terminal 100 has been previously received from one or more of the computer terminals. In some embodiments, the content server 140 generates the posterior probability value based on processing a combination of the terminal signature tuple contained in the access request message and the terminal signature tuples contained in the historical repository 142. The content server 140 then uses (block 218) the posterior probability value to control whether access is granted to the access request for the computer terminal 100 access the resource content controlled by the content server 140.

In one embodiment, responsive to the posterior probability value satisfying a comparison to a defined threshold value, the content server 140 grants the computer terminal 100 access to the content addressed by the content identifier and communicates corresponding grant response message to the computer terminal 100. In sharp contrast, responsive to the posterior probability value not satisfying comparison to the defined threshold value, the content server 140 denies the computer terminal 100 access to the content addressed by the content identifier and communicates a corresponding denial response message to the computer terminal 100. The computer terminal 100 controls (block 220) its operations to attempt to access the content based on the received one of the grantor denial response messages.

In one embodiment, the grant response provided to the computer terminal 100 contains a code which is used to unlock content residing in memory of the computer terminal 100. In another embodiment, the grant response provided to the computer terminal 100 notifies the user that the content will be provided through the computer terminal 100 and/or contains a storage address for the content which is used by the computer terminal 100 to obtain the content through the content server 140. The content server 140 may encrypt the content provided to the computer terminal 100, and the computer terminal 100 may operate to decrypt the content using a key that was provided to the mobile terminal 100 as content of the grant response message.

In this manner, intrinsic operational performance characteristics of the computer terminal 100 are used to generate a terminal signature tuple that may uniquely identify the computer terminal 100 and which may by some embodiments not be impersonated by a fraudster operating any other computer terminal. The content server 140 can therefore restrict access to the content having the content identifier to when the authorized user is operating the computer terminal 100 which provides a terminal signature tuple that matches or sufficiently matches an earlier terminal signature tuple that was stored in the repository 142.

Although the operations of FIG. 2 have been described in the context of a single computer terminal, these operations can be performed to register a plurality of users operating a plurality of different computer terminals for authorized access to any number of content items having any number of content identifiers, and can furthermore be performed to restrict access to each of the content identifiers to authorized users who are operating authorized ones of the computer terminals. The content server 140 can therefore receive content access registration messages and content request messages from any number of computer terminals 100 with respect to any number of content items that are available through the content server 140. By repeating the operations of FIG. 2, the content server 140 can operate to, for each of the content identifiers in the repository 142, selectively grant access, through the content server 140 to the content having the content identifier based on the posterior probability value that is generated to indicate the likelihood that a terminal signature tuple received in an access request matches or sufficiently matches an earlier received terminal signature tuple within a defined sampling window (e.g., last 100 received terminal signature tuples from computer terminals).

Although FIG. 2 illustrates an initial request message (block 202) that is communicated separately from an access request message (block 212), it is to be understood that the messages can be combined into a single message or that more messages may be used. Thus, for example, the computer terminal may generate the operational metrics (blocks 208 and 210) and communicate the access request containing the terminal signature tuple which is generated based on the operational metrics therefrom.

Figure 3:
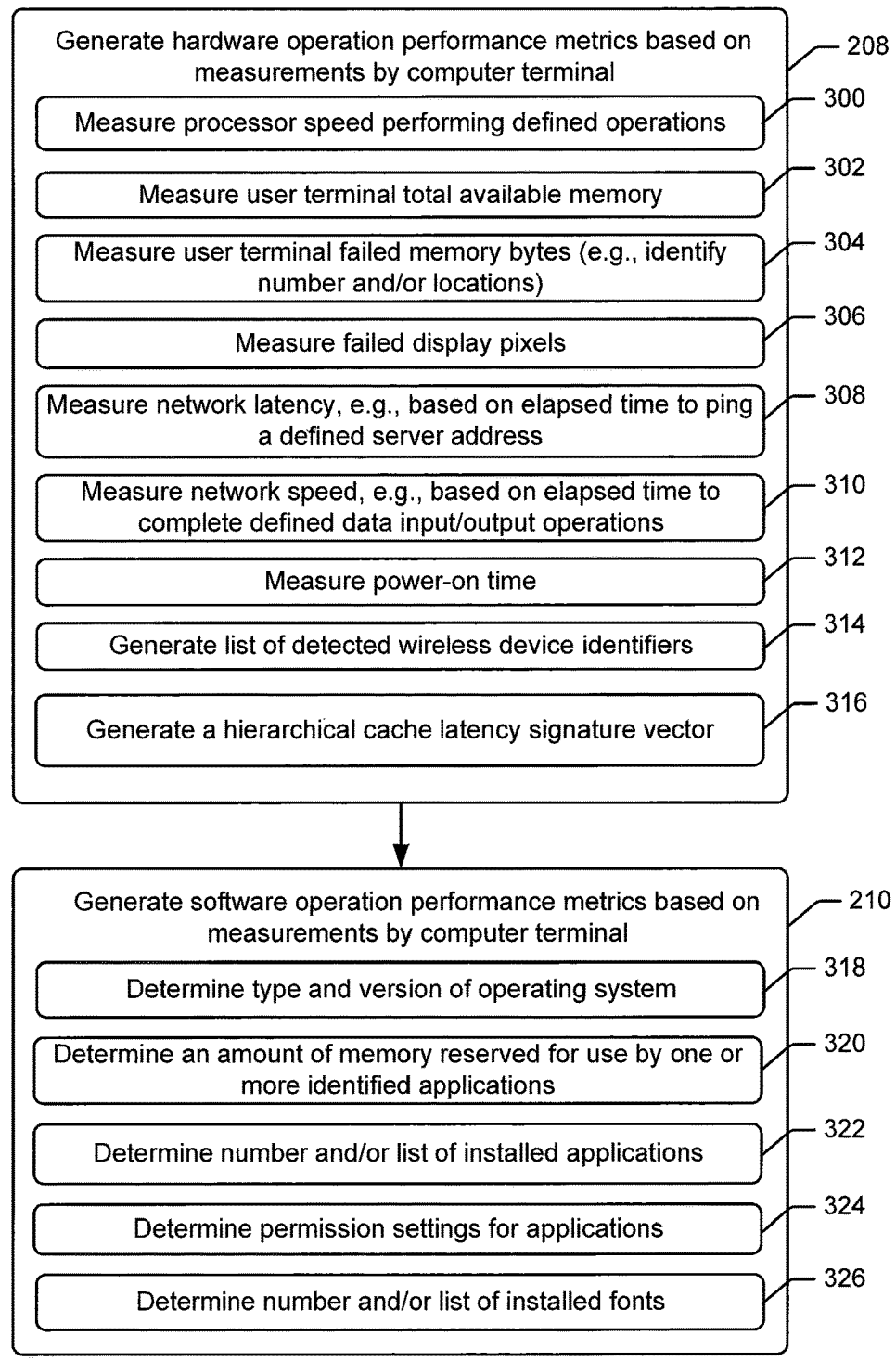
FIG. 3 is a flowchart of operations by a computer terminal to generate hardware and software operational performance metrics based on measurements by the computer terminal for use in generating a terminal signature tuple in accordance with some embodiments of the present disclosure.

FIG. 3 is a flowchart of operations by the computer terminal 100 to generate hardware and software operational performance metrics based on measurements by the computer terminal 100, and to generate a terminal signature tuple therefrom that identifies the computer terminal 100 for use in controlling its access to content available through the content server 140, in accordance with some embodiments of the present disclosure.

Referring to FIG. 3, the computer terminal 100 generates hardware operational performance metrics and/or software metrics based on measurements by the computer terminal 100. One or more of the illustrated operations may be performed to generate (block 208) hardware performance metrics and/or generate (block 210) software metrics which are then used to generate (block 212) the terminal signature tuple.

The computer terminal 100 can generate (block 208) computer terminal hardware metrics based on measuring (block 300) an processing speed of the computer terminal 100 while performing defined operations. In one embodiment, the computer terminal 100 measures an elapsed time for a processor of the computer terminal 100 to complete execution of a defined set of operations, and generates the operational performance metric based on the elapsed time. Because the elapsed time will depend on processor clock rate, processor architecture, memory read/write speed, and bus access speeds, minor variations introduced into each of these computer terminal components during their fabrication which result in speed differences between any two processing platforms even when manufactured from the same component fabrication lines. The elapsed time determined by a fraudster's computer terminal should therefore be different from the elapsed time determined by an authorized user's terminal 100. Consequently, the terminal metric identifiers generated by the fraudster's and the authorized user's terminals based on their separate measurements of the elapsed time should be different.

The computer terminal 100 may generate the performance metric information based on measuring (block 302) the total available memory in the computer terminal 100. The computer terminal 100 may generate the operational performance metric based on measuring (block 304) the number of failed memory bytes in a memory of the computer terminal 100. Thus, for example, an application executed by the computer terminal 100 may identify failed memory bytes and count the number of failed memory bytes, or may obtain that count from another circuit or application. Because the number of failed memory bytes in a memory of the fraudster's computer terminal should be different from the number of failed memory bytes in a memory of the authorized user's terminal 100, the terminal metric identifiers generated by the fraudster's and the authorized user's terminals based on their separate determinations of the number of failed memory bytes should be different.

The computer terminal 100 may generate the operational performance metric based on measuring (block 306) the number of failed display pixels in a display device of the computer terminal 100. Because the number of failed display pixels in a display device of the fraudster's computer terminal will likely be different from the number of failed display pixels in a display device of the authorized user's terminal 100, the terminal metric identifiers generated by the fraudster's and the authorized user's terminals, based on their separate measurements of the number of failed display pixels should be different.

The computer terminal 100 may generate the operational performance metric based on determining (block 308) network latency, which may be determined based on measuring network communication latency for a communication between the computer terminal 100 and a defined server address through the data network 120. In one embodiment, the computer terminal 100 measures an elapsed time between communicating a ping request to a network server and receiving a ping response from the network server, and then generates the operational performance metric based on the elapsed time. Because the physical distance over which the message propagates from the computer terminal 100 to the network server and the number of forwarding nodes in the network between the computer terminal 100 to the network server will be different for the message from the fraudster's computer terminal compared to the message from the authorized user's terminal 100, the terminal metric identifiers generated by the fraudster's and the authorized user's terminals based on their separate measurements of the elapsed time should be different.

The computer terminal 100 may generate the operational performance metric based on measuring (block 310) network speed, which may be determined based on measuring elapsed time to complete a defined data input and/or output operations with a defined network server through the data network 120. Again, because the physical distance over which the data propagates between the computer terminal 100 and the network server and the number of forwarding nodes in the network will be different for the data input/output with the fraudster's computer terminal compared to the data input/output with the authorized user's terminal 100, the terminal metric identifiers generated by the fraudster's and the authorized user's terminals based on their separate measurements of the network speed should be different.

The computer terminal 100 may generate the operational performance metric based on measuring (block 312) a tracked total operational power-on time since initialization of the computer terminal 100. Again, the operational performance metric generated by a fraudster's computer terminal based on tracked total operational power-on time should be different and, consequently, the resulting terminal metric identifier generated therefrom should be different from what is generated for the authorized user's terminal 100.

The computer terminal 100 may generate the operational performance metric based on generating (block 314) a list of wireless terminal identifiers of wireless devices that are detectable by the computer terminal 100 through one or more wireless transceiver interfaces of the computer terminal 100. The list may include wireless terminal identifiers of wireless devices that are observable through any type of wireless communication technology by the computer terminal 100. In one example embodiment, the list of wireless terminal identifiers can include a list of Bluetooth devices that indicated to have established a traffic data connection through completing pairing to the computer terminal 100, but alternatively or additionally the list can include Bluetooth devices that are not paired to the computer terminal 100 but are presently observed to be within communication range of a Bluetooth transceiver of the computer terminal 100 through operations for discovering Bluetooth devices. In another example embodiment, the list of wireless terminal identifiers can include a list of wireless local area network, WLAN, (e.g., WIFI) devices that are indicated to have established a traffic data connection with the computer terminal 100 through joining a shared network that includes the computer terminal 100 (e.g., WIFI shared network or WIFI Direct), but alternatively or additionally the list can include WLAN devices that are not connected to the computer terminal 100 but which have been discovered to be within communication range of a WLAN transceiver of the computer terminal 100 through operations for discovering WLAN routers and other devices. Because the lists of wireless terminal identifiers detected by the authorized user's terminal 100 (e.g., within the authorized user's home or office) will likely be different from the wireless terminal identifiers detected by a fraudster's computer terminal, the terminal metric identifiers generated therefrom should be different between the computer terminals.

The computer terminal 100 may generate the operational performance metric based on generating (block 316) a hierarchical cache latency signature vector using one or more of the methods and operations described below regard to FIGS. 4-7.

The computer terminal 100 may generate (block 210) one or more software operational performance metrics based on measurements or other determinations by the computer terminal 100. The one or more software operational performance metrics can be determined based on any one or more of: determining (block 318) a type and version of an operating system executed by the computer terminal 100; determining (block 320) an amount of memory reserved for use by one or more identified applications hosted by the computer terminal 100; determining (block 322) a number and/or a list of presently executing applications by the computer terminal 100 and/or determining a list of applications that are stored in nonvolatile memory of the computer terminal 100 and/or a list of applications that are available for execution; determining (block 324) permission settings for one or more identified applications residing in the computer terminal 100; and determining (block 326) a number of fonts installed in the computer terminal 100 and/or based on a list of the fonts installed in the computer terminal 100.

In one example embodiment, the computer terminal generates a software operational performance metric based on a list of applications stored in the computer terminal 100 and the permission settings that have been defined for each of those applications. The permission settings that can be determined for an application based on whether the application has been granted access to any one or more of the following: permission to access camera data from a camera; permission to access audio data from a microphone; permission to write data to a defined external interface of the computer terminal 100; permission to read data from a defined external interface of the computer terminal 100; permission to access sensor data from a defined sensor of the computer terminal 100; permission to be informed when the computer terminal 100 becomes unlocked; permission to access the Internet; and permission to access geolocation information of the computer terminal 100.

The computer terminal 100 then generates (e.g., block 212 of FIG. 2) a terminal signature tuple by adding each of the hardware performance metrics and/or software performance metrics as separate entries to a data structure.

In some further embodiments, the mobile terminal 100 and/or the content server 140 can be configured to compensate for variability in the operational performance metrics that can occur between measurements by the computer terminal 100. For example, the computer terminal 100 may track changes that its measures or observes over time in various of the operational performance metrics and may provide notice of those changes to the content server 140 to allow the content server 140 to compensate for the changes and/or the computer terminal 100 may use the tracked changes locally to compensate for the changes when generating the terminal metric identifier the types of operational performance metrics used to generate the terminal metric identifier may be controlled based on the observed tracked changes. For example, operational performance metrics that experience rapid changes (e.g., non-linear changes) during early life of the computer terminal 100 may not be selected for use for generating the terminal signature tuple until a threshold rate of change is observed (e.g., using linear predictable changes).

Figure 4:
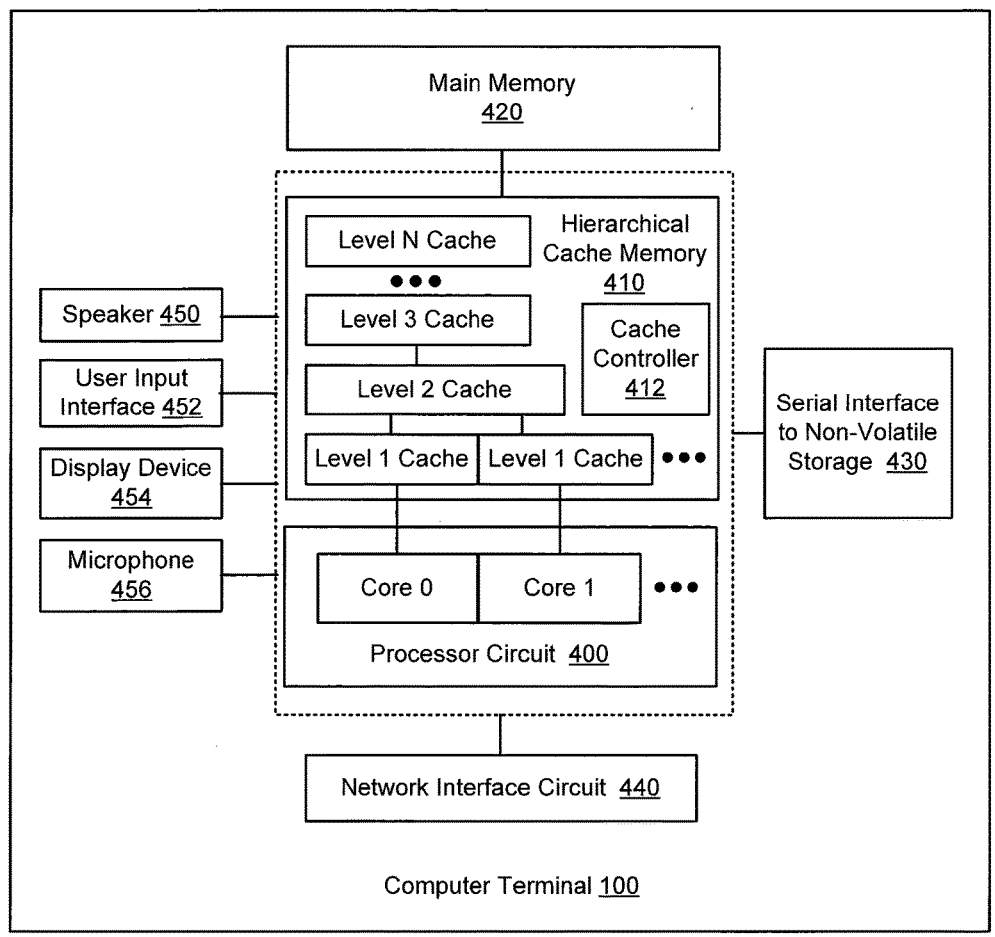
FIG. 4 is block diagram of a computer terminal that includes a processor coupled to a hierarchical memory structure having a plurality of levels of cache memories that hierarchically cache data which is read by the processor from a main memory of the computer terminal, and which generates a hierarchical cache latency signature vector for use is generating a terminal signature tuple in accordance with some embodiments of the present disclosure.
Figure 5:
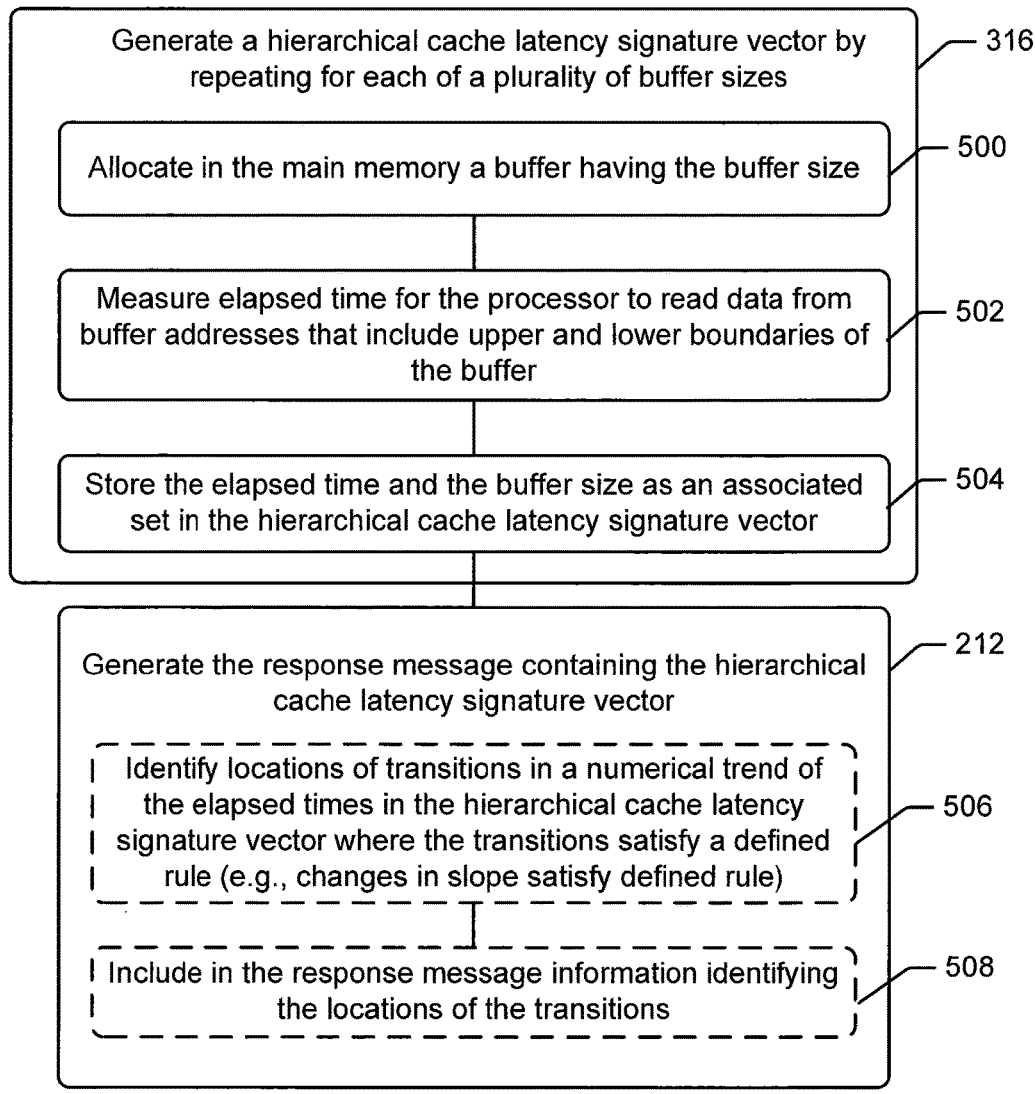
FIG. 5 is a flowchart of operations by the computer terminal of FIG. 4 to generate a hierarchical cache latency signature vector in accordance with some embodiments of the present disclosure.

FIG. 4 is a block diagram of the computer terminal 100 that generates (block 316, FIG. 3) a hierarchical cache latency signature vector in accordance with some embodiments of the present disclosure. FIG. 5 is a flowchart of operations by a processor circuit 400 coupled to a hierarchical memory structure that includes a hierarchical cache memory 410 having a plurality of levels of cache memories that hierarchically cache data which is read by the processor 400 from a main memory 420 of the computer terminal 100 in accordance with some embodiments of the present disclosure. The hierarchical memory structure may furthermore include non-volatile storage devices that are external to the computer terminal 100 but coupled thereto through a serial interface 430. Example non-volatile storage devices coupled through the serial interface 430 can include, but are not limited to, external solid-state drives (e.g., flash memory based drives), magnetic disk drives, and optical disk drives.

Referring to the nonlimiting embodiments shown in FIG. 4, the illustrated processor 400 includes a plurality of parallel processing instruction execution core circuits (e.g., Core 0, Core 1, etc.). The illustrated hierarchical cache memory 410 includes two Level 1 cache memory circuits, each correspondingly coupled to a different one of the core circuits to cache data read by the respective core circuit from the main memory 420. The illustrated hierarchical cache memory 410 has higher level cache memory circuits that include Level 2 cache, Level 3 cache, and Level N cache which hierarchically cache data that is read by anyone of the core circuits from the main memory 420.

A cache controller 412 controls different write polices and/or different replacement policies. Responsive to one of core circuits initiating a read cycle for an address, the cache controller 412 checks the Level 1 cache first, which can have the fastest access but also the smallest storage capacity relative to higher level cache memory circuits; if the data is stored in the Level 1 cache (i.e., a cache hit), the data is read from the Level 1 cache and provided to the core circuit. In contrast, when the data is not stored in the Level 1 cache, the cache controller 412 checks the Level 2 cache, which can have the next fastest access but also the next smallest storage capacity relative to higher level cache memory circuits; if the data is stored in the Level 2 cache (i.e., a cache hit), the data is read from the Level 2 cache and provided to the core circuit. When the data is not stored in the Level 2 cache, the cache controller 412 repeats this process of checking higher levels of the cache memories until the data is read from a higher cache level or, if not stored in any of the cache memory levels, the data is read from the main memory 420 and provided to the core circuit and stored in one or more of the cache memory levels depending upon the write policies and/or replacement policies followed by operations by the cache controller 412.

The computer terminal 100 further includes a network interface circuit 240 that can communicate with the content server 140 via one or more data networks and intervening radio access networks 130 and/or wired edge nodes. The network interface circuit 240 may include a radio access transceiver that can include, but is not limited to, a LTE or other cellular transceiver, WIFI transceiver (IEEE 802.11), WiMax transceiver, Bluetooth transceiver, or other radio communication transceiver configured to communicate with the content server 140 via the radio access network 130. The computer terminal 100 may further include a speaker 450, a user input interface 452 (e.g., keyboard, touch sensitive display, etc.), display device 454, and/or a microphone 456.

Further reference is made to FIG. 5 which illustrates operations by the processor 400 for generating a hierarchical cache latency signature vector which is used to generate a terminal signature tuple for the computer terminal 100 in accordance with some embodiments of the present disclosure. The processor 400 generates (block 316) the hierarchical cache latency signature vector by repeating for each of a plurality of different buffer sizes the operations shown in blocks 500-504. The plurality of buffer sizes include a first buffer size that is smaller than a storage capacity of a lowest level of the cache memories (i.e., Level 1 cache), a second buffer size that is larger than the storage capacity of the lowest level of the cache memories (i.e., Level 1 cache) and smaller than a storage capacity of a next higher level of the cache memories (i.e., Level 2 cache), and a third buffer size that is larger than the storage capacity of the next higher level of the cache memories (i.e., Level 2 cache).

When there are more levels of cache memories, e.g., Levels 3 through N, the plurality of different buffer sizes can include more buffer sizes. For example, the third buffer size can be larger than the storage capacity of the next higher level of the cache memories (i.e., Level 2 cache) and smaller than a storage capacity of a next higher level of the cache memories i.e., Level 3 cache). A fourth buffer size can be larger than the storage capacity of the next higher level of the cache memories (i.e., Level 3 cache) and smaller than a storage capacity of a next higher level of the cache memories (i.e., Level N cache).

For each of the defined buffer sizes, the processor 400 repeats operations to: 1) allocate (block 500) in the main memory 420 a buffer having the buffer size; 2) measure (block 502) elapsed time for the processor 400 to read data from buffer addresses that include upper and lower boundaries of the buffer; and 3) store (block 504) the elapsed time and the buffer size as an associated set in the hierarchical cache latency signature vector.

The processor 400 then generates (block 212) a response message containing the hierarchical cache latency signature vector as part of the terminal signature tuple computer identification message containing computer terminal identification information that is generated based on content of the hierarchical cache latency signature vector.

The processor 400 may repeat the operations of blocks 500-504 a defined plural number of times to repetitively measure the elapsed time for the processor to read data from buffer addresses that include upper and lower boundaries of the buffer. After completing the defined number of repetitions, the processor 400 can combine the elapsed times from the repeated measurements to generate the elapsed time that is stored with the buffer size as an associated set in the hierarchical cache latency signature vector. For example, the elapsed times from the repeated measurements can be averaged to generate an average elapsed time for the processor 400 to read data across the range of the buffer size. Combining the elapsed times from the repeated measurements in this manner can provide a more accurately repeatable resulting elapsed time value for storage in the hierarchical cache latency signature vector. Consequently, the same computer terminal 100 can repetitively generate a substantially identical hierarchical cache latency signature vector at spaced apart times, which enables the hierarchical cache latency signature vector to be used to generate computer terminal identification information for use in identifying the computer terminal 100.

In one embodiment, the computer terminal 100 may operate to control the processor 400 to lock to a single one of the instruction processing cores, e.g., to one of core 0, core 1, etc., processing of instructions performing the operations for generating a hierarchical cache latency signature vector. Because the illustrated processor 400 has a plurality of instruction processing cores it may be advantageous to lock the instructions for generating the hierarchical cache latency signature vector to a single core so that its instructions are serially processed by the single core. If the instructions are not forced to be serially processed by the single core but instead are allowed to be processed by a plurality of different processing threads through a plural number of the processing cores, the multi-threading management microcode of the processor 400 may introduce randomness and consequential variability between repetitions of the measurements (block 502) of the elapsed times. Such variability in measurements between repetitions may decrease the ability for the computer terminal 100 to generate a substantially identical hierarchical cache latency signature vector from repetitions performed at spaced apart times, which can decrease the usefulness of the hierarchical cache latency signature vector to be used within the terminal signature tuple to identify the computer terminal 100.

In some further embodiments, the operations for generating (block 316 of FIG. 3) the response message containing the hierarchical cache latency signature vector can include identifying locations (block 506) where transitions in a numerical trend through associated sets of the elapsed times and the buffer sizes in the hierarchical cache latency signature vector satisfy a defined rule. The locations of the transitions which satisfy the defined rule can identify which corresponding ones of the buffer sizes caused the processor to read some data from a lower one of the cache memories and to read other data from a higher one of the cache memories or the main memory. The hierarchical cache latency signature vector can then be generated (block 508) to include information identifying the locations of the transitions, and the terminal signature tuple can be generated to contain the locations of the transitions.

In a further embodiment, the operations to identify (block 506) the locations where transitions in the numerical trend through associated sets of the elapsed times and the buffer sizes in the hierarchical cache latency signature vector satisfy the defined rule, can include identifying (block 506) locations (e.g., buffer size and elapsed time value pairs corresponding to the locations) where slopes of the numerical trend through associated sets of the elapsed times and the buffer sizes in the hierarchical cache latency signature vector change by a threshold value determined based on the defined rule. The terminal signature tuple can be generated (block 508) to contain the determined locations where the slopes of the numerical trend through associated sets of the elapsed times and the buffer sizes in the hierarchical cache latency signature vector changed by the threshold value.

Figure 6:
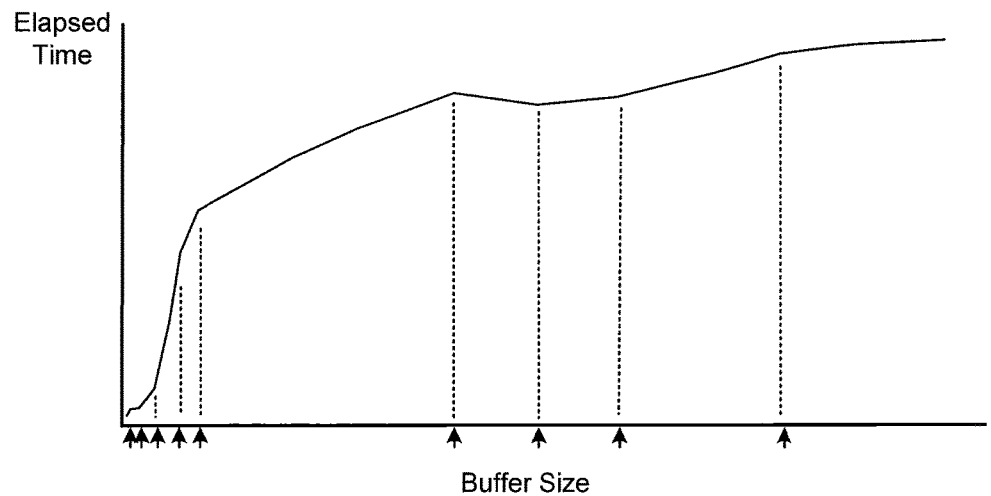
FIGS. 6 and 7 illustrate graphs of numerical trends through associated sets of elapsed times and buffer sizes in hierarchical cache latency signature vectors that are respectively generated by two processors having different hierarchical memory structures performing the operations of FIG. 5 in accordance with some embodiments of the present disclosure.
Figure 7:
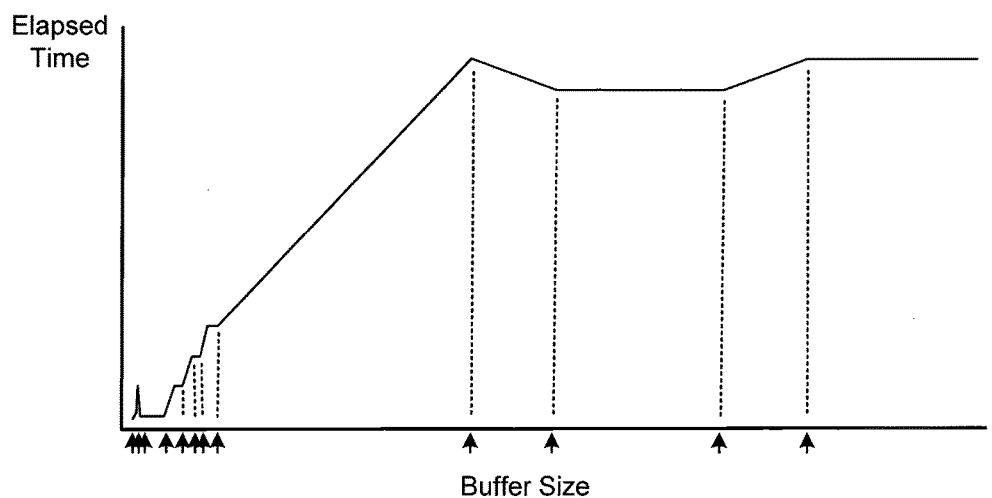

FIGS. 6 and 7 illustrate graphs of numerical trends through associated sets of elapsed times and buffer sizes in hierarchical cache latency signature vectors that are respectively generated by two processors having different hierarchical memory structures performing the operations of FIG. 5 in accordance with some embodiments of the present disclosure.

The numerical trends illustrated in the FIGS. 6 and 7 are different because the hierarchical cache latency signature vectors of each of the two terminals are different, due to, for example, different numbers of internal and/or external cache layers, different cache memory storage capacities, different read or write cache and/or main memory access speeds, different write polices, different replacement policies, and/or different cache write policy (e.g., write-through or write-back) resulting in different elapsed times. Moreover, random or intentional process variations during fabrication of the cache memory circuits and control circuitry, e.g., cache controller 412, can affect the elapsed times and result in further differentiation between the hierarchical cache latency signature vectors.

FIG. 6 illustrates the numerical trend through associated sets of the elapsed times and the buffer sizes in the hierarchical cache latency signature vector which is generated for a first computer terminal. The illustrated numerical trend shows that the briefest elapsed times occur when the processor is reading data from a plurality of buffer addresses, of a buffer allocated in the main memory 420, extending between boundaries of the smaller buffer sizes toward the left side of the graph. In contrast, the longest elapsed times occur when the processor is reading data from a plurality of buffer addresses, of a buffer allocated in the main memory 420, extending between boundaries of the larger buffer sizes toward the right side of the graph. The elapsed times do not change linearly with buffer size, but instead have identifiable locations where transitions occur in the slope of the numerical trend through associated sets of the elapsed times and the buffer sizes in the initial hierarchical cache latency signature vector satisfy a defined rule. Locations of at least some of these transitions are illustrated in FIG. 6 by the upward facing arrows along the buffer size axis.

The locations of the transitions correspond to which adjacent ones of the buffer sizes caused changes in where the processor 400 is provided data from a read operation. For example, one buffer size causes the processor 400 to read some data from a lower one of the cache memories (e.g., the Level 1 cache) and to read other data from a higher one of the cache memories (e.g., the Level 2 cache) or the main memory 420. Following the numerical trend from the left to the right, the early smaller allocated buffer sizes enable the processor 400 to perform read operations entirely within the Level 1 cache, after the cache controller 412 stores the initial cycle of data read from the small size allocated buffer in the main memory 420 in the Level 1 cache. As the buffer sizes increase further beyond the storage capacity of the Level 1 cache, the processor 400 begins to have Level 1 cache misses for some of the data that is read and resulting in delays as the data is read from the Level 2 cache. As the buffer sizes increase further beyond the storage capacity of the Level 2 cache, the processor 400 begins to have Level 1 cache and Level 2 cache misses for some of the data that is read and resulting in delays as the data is read from the Level 3 cache. As the buffer sizes increase further beyond the storage capacity of the Level 3 cache, the processor 400 begins to have Level 1 cache, Level 2 cache, and Level 3 misses for some of the data that is read and resulting in delays as the data is read from the higher level N cache(s) or the main memory 420. These increasing levels of cache misses with the associated slower access times of the higher level cache memory circuits and the main memory 420 results in increasing elapsed times. Other transitions in the numerical trends can occur where the repetitive sequential read operations across the various allocated buffer sizes trigger different write polices, different replacement policies, and/or different cache write policy (e.g., write-through or write-back) performed by micro-code operations of the cache controller 412.

FIG. 7 illustrates the numerical trend through associated sets of the elapsed times and the buffer sizes in the hierarchical cache latency signature vector which is generated for a second computer terminal. The number of transitions and the locations of where the transitions in the numerical trend of FIG. 7 satisfy the defined rule are much different than what is illustrated in FIG. 6.

In accordance with some embodiment, the number of transitions and/or the locations of where the transitions in the numerical trend through associated sets of the elapsed times and the buffer sizes in the hierarchical cache latency signature vector generated for a computer terminal are used to generate the terminal signature tuple which can uniquely identify one computer terminal from another computer terminal.

In some embodiments, the computer terminal 100 operates to determine (block 506) the number of transitions and/or the locations of where the transitions in the numerical trend through associated sets of the elapsed times and the buffer sizes in the hierarchical cache latency signature vector satisfy a defined rule, and which are used to generate (block 508) the terminal signature tuple to uniquely identify one computer terminal from another computer terminal.

In some other embodiments, the content server 140 receives an updated hierarchical cache latency signature vector from a computer terminal and compares a numerical trend through the sets of the elapsed times and the buffer sizes in the updated hierarchical cache latency signature vector to a numerical trend through the sets of the elapsed times and the buffer sizes in an earlier received hierarchical cache latency signature vector.

Thus, in view of these embodiments the terminal signature tuple can contain a plurality of hardware operational performance metrics, which can include measurements of elapsed time for processor of the computer terminal to read data from ranges of buffer addresses within a hierarchical cache memory, measurements of processor speed, measurements of user terminal total available memory, measurements of user terminal failed memory bytes, measurements of failed display pixels, measurements of network latency, measurements of network speed, measurements of power-on time, and other hardware operational performance metrics and, furthermore, may contain metrics based on software operational performance. Some or all of the hardware operational performance metrics and/or software operational performance metrics may change over time, resulting in differences in the signature tuples generated therefrom for the same computer terminal.

Some further embodiments of the present disclosure are directed to operations and methods by the content server 140 to determine trustworthiness of a computer terminal 100 based on its determination of a probability that the terminal signature tuple that is presently received from the computer terminal 100 has been previously received, in spite of differences that can occur in the signature tuples received from that computer terminal 100. In this manner, a myriad of different operational performance metrics can be used to generate a terminal signature tuple which is used to identify a computer terminal 100 and control access by the computer terminal 100 to content available through the content server 140. Moreover, the operations used by the content server 140 to control access by the computer terminal 100 are adaptive to changes that allow the terminal signature tuples to be generated based on operational performance metrics that change over time between content access requests and/or between a registration instance and a subsequent content access request.

FIGS. 8-13 are flowcharts of operations by a content server 140 to control access to content available through the content server 140 responsive to an access request message containing a terminal signature tuple, which was generated based on measurements of terminal operational performance metrics, and based on a related determination of the probability that the terminal signature tuple has been previously received, in accordance with some embodiments of the present disclosure.

The operations of FIGS. 8-13 are explained in the context of the content server 140 receiving access requests from computer terminals 100, and authenticating or otherwise determining privileges for the computer terminals 100 responsive to content of the access requests. Each access request includes a terminal identifier provided by the computer terminal 100 and a terminal signature that was generated by the computer terminal 100. The combination forms a terminal signature tuple (Di, Si), where D represents an identifier for the computer terminal 100, such as a MAC (media access control) address, and S represents a terminal signature.

The terminal signature S may be an array or other listing of hardware operational performance metrics and/or software operational performance metrics that were measured by the computer terminal 100, such as explained above. In some embodiments, the terminal signature $S_1$ for a first computer terminal $D_1$ includes an array containing one or more of:

1) values identifying locations where transitions in the numerical trend through associated sets of the elapsed times and the buffer sizes in the hierarchical cache latency signature vector generated by the first computer terminal $D_1$ satisfy a defined rule (e.g., block 506 of FIG. 5);

2) values identifying processor speed (e.g., block 300 of FIG. 3);

3) values identifying computer terminal total available memory (e.g., block 302 of FIG. 3);

4) values identifying number of computer terminal failed memory bytes and/or locations of the failed memory bytes (e.g., block 304 of FIG. 3);

5) values identifying number of computer terminal failed display pixels and/or locations of the failed display pixels (e.g., block 306 of FIG. 3);

6) values identifying network latency (e.g., block 308 of FIG. 3);

7) values identifying network speed (e.g., block 310 of FIG. 3);

8) values identifying power on-time (e.g., block 312 of FIG. 3);

9) values identifying a list of detected wireless terminal identifiers (e.g., block 314 of FIG. 3);

10) values identifying a type and/or version of an operating system of the computer terminal 100 (e.g., block 318 of FIG. 3);

11) values identifying an amount of memory reserved for use by one or more identified applications hosted by the computer terminal 100 (e.g., block 320 of FIG. 3);

12) values identifying a number and/or a list of presently executing applications by the computer terminal 100 and/or a list of applications that are stored in nonvolatile memory of the computer terminal 100 and/or a list of applications that are available for execution (e.g., block 322 of FIG. 3);

13) values identifying permission settings for one or more identified applications residing in the computer terminal 100 (e.g., block 324 of FIG. 3); and 14) values identifying a number of fonts installed in the computer terminal 100 and/or based on a list of the fonts installed in the computer terminal 100 (e.g., block 326 of FIG. 3).

In accordance with at least some embodiments, the content server 140 stores the terminal signature tuples in a historical repository 142. The content server 140 processes the terminal signature tuple of a newly received access request using the historical repository 142 to generate a probability value that indicates a likelihood that the access request was received from a computer terminal 100 that has previously sent an access request. The probability value is used to improve the accuracy of the authentication process.

In one embodiment, when processing of a newly received access request generates a probability value that indicates more than a threshold likelihood that its source computer terminal 100 has been previously seen by the content server 140, access is granted to the access request for the source computer terminal 100 to access a resource, such as content (e.g., web page information, user account information, application data, etc.) which is controlled by the content server 140 and referenced by the access request. In contrast, when the probability value indicates less than the threshold likelihood that its source computer terminal 100 has been previously seen by the content server 140, access by the access request is denied so that the source computer terminal 100 is blocked from accessing the resource controlled by the content server 140.

In another embodiment, instead of denying access when the probability value indicates less than the threshold likelihood that its source computer terminal 100 has been previously seen by the content server 140, the content server 140 restricts the type of information and/or the amount of information that is made accessible to the computer terminal 100. In one embodiment, the content server 140 associates different groupings of information (e.g., different levels of confidential information and/or different amounts of user information details) with different threshold levels of the probability value, and selectively makes only one of the information groupings available to the computer terminal 100 responsive to the determined probability value.

These and further embodiments will now be described in the context of FIG. 8, which is a flowchart of operations that may be performed by a content server 140 to authenticate a computer terminal 100 and control access by the computer terminal 100 to content or other resource controlled by the content server 140.

Figure 8:
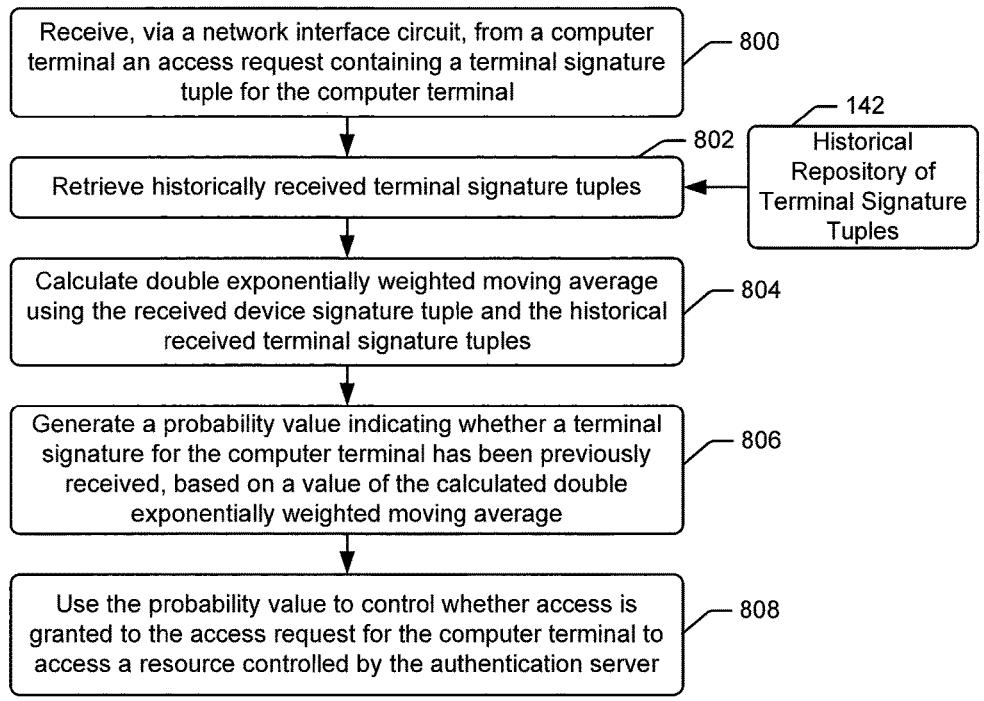
FIGS. 8-13 are flowcharts of operations by a content server to control access to content available through the content server responsive to an access request message containing a terminal signature tuple, which was generated based on measurements of terminal operational performance metrics, and based on a related determination of the probability that the terminal signature tuple has been previously received, in accordance with some embodiments of the present disclosure.
Figure 9:
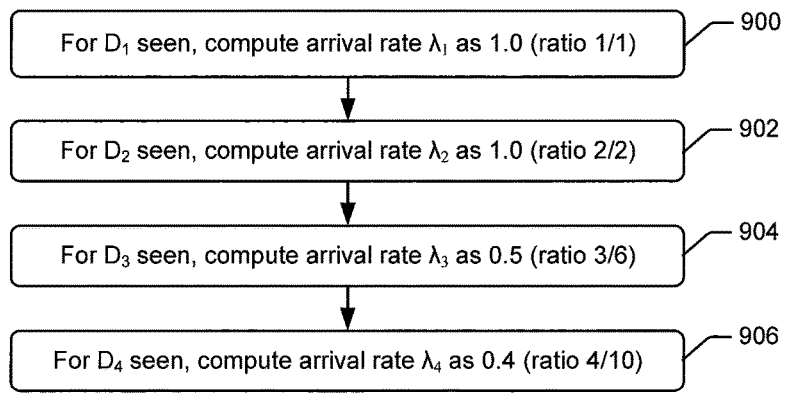

Referring to FIG. 8, the content server 140 maintains in a memory device a historical repository 142 of terminal signature tuples received from a plurality of computer terminals, where each of the terminal signature tuples containing a terminal identifier for a computer terminal and a terminal signature characterizing a measured operation by the computer terminal. The content server 140 receives (block 800) an access request from a source computer terminal 100 via a network interface circuit 440. The access request contains a terminal signature tuple including a terminal identifier for the source computer terminal 100 and a terminal signature characterizing a measured operation by the source computer terminal 100. The content server 140 retrieves (block 802) a set of historical received terminal signature tuples from the historical repository 142, and calculates a posterior probability value based on processing a combination of the terminal signature tuple contained in the access request message and the terminal signature tuples contained in the historical repository 142.

In some embodiments, the content server 140 calculates the posterior probability value based on calculating (block 804) a double exponentially weighted moving average using the received terminal signature tuple and a set of the historical received terminal signature tuples. The content server 140 may generate (block 806) the posterior probability value based on a value of the calculated double exponentially weighted moving average, where the probability value indicates a likelihood that the terminal signature tuple has been previously received among a set of the terminal signature tuples contained in the historical repository in the memory device. In one embodiment, the posterior probability value indicates a likelihood that the terminal signature tuple has been previously received from the computer terminal 100 or another already seen computer terminal 100, or from another previously unseen computer terminal 100. The content server 140 then uses the probability value to control (block 808) whether access is granted for the access request from the computer terminal 100 to access a resource that is controlled by the content server 140.

Further operations and methods that may be used a content server 140 to generate the posterior probability value are explained below in the context of a non-limiting example embodiment. According to the example embodiment, the content server 140 has sequentially received and stored the following ten terminal signature tuples in the historical repository 142: $(D_1,S_1)$, $(D_2,S_2)$, $(D_1,S_1)$, $(D_1,S_3)$, $(D_2,S_2)$, $(D_3,S_3)$, signature/tuples $(D_2,S_2)$, $(D_3,S_3)$, $(D_4,S_4)$. As explained above, $D_i$ represents the terminal identifier, such as a MAC (media access control) address, and $S_i$ represents the terminal signature.

When operating with a window size of 10, meaning that the probability value is generated based on the last 10 terminal signature tuples received by the content server 140 and stored in the historical repository 142, first occurrence arrival rates $\lambda_i$ for each of the four unique terminal identifiers ($D_1$, $D_2$, $D_3$, $D_4$) that were received are calculated based on a ratio of a sequence order of first occurrence of the respective terminal identifier among content of the terminal signature tuples in the historical repository to a number of terminal signature tuples that have been received (contained in the historical repository) at a time of receipt of that first occurrence. Referring to the flowchart of operations shown in FIG. 9, according to the example embodiment the arrival rates A are calculated based on a moving average as follows:

1) For the first terminal identifier $D_1$, its first occurrence arrival rate $\lambda_1$ is calculated (block 900) a ratio of a first (1) unique terminal identifier that has been received to the first (1) terminal signature tuple received by that time, (since the ($D_1$,$S_1$) is the first (1) received terminal signature tuple), which provides a ratio of 1/1 and results in a value of 1.0;

2) For the second terminal identifier $D_2$, its first occurrence arrival rate $\lambda_2$ is calculated (block 902) as a ratio of the second (2) unique terminal identifier that has been received to the second (2) terminal signature tuple in which it occurs among the sequence of tuples received by that time, (since the ($D_2$,$S_2$) is the second (2) received terminal signature tuple), which provides a ratio of 2/2 and results in a value of 1.0;

3) For the third terminal identifier $D_3$, its first occurrence arrival rate $\lambda_3$ is calculated (block 904) as a ratio of the third (3) unique terminal identifier that has been received to the sixth (6) terminal signature tuple in which it occurs among the sequence of tuples received by that time, which provides a ratio of 3/6 and results in a value of 0.5; and 4) For the fourth terminal identifier $D_4$, its first occurrence arrival rate $\lambda_4$ is calculated (block 906) as a ratio of the fourth (4) unique terminal identifier that has been received to the tenth (10) terminal signature tuple in which it occurs among the sequence of tuples received by that time, which provides a ratio of 4/10 and results in a value of 0.4.

Figure 10:
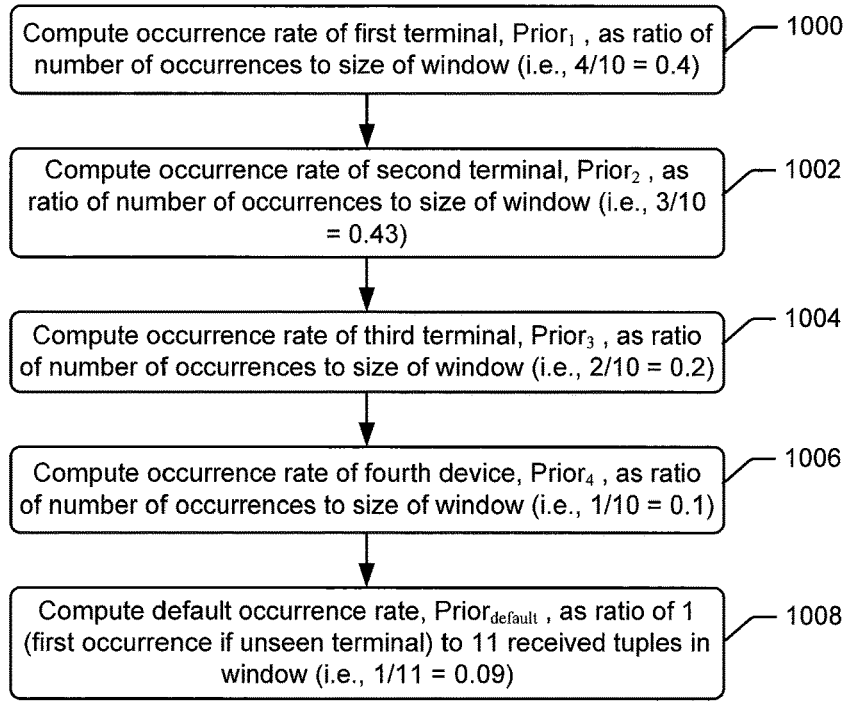

Referring to the flowchart of operations shown in FIG. 10, according to the example embodiment the rates of occurrences ("$Prior_i$") are calculated for each of the terminal identifiers based on the following operations:

1) Rate of occurrence of the first terminal identifier $D_1$, "$Prior_1$" is calculated (block 1000) as a ratio of the number of occurrences of the first terminal identifier $D_1$ within the window to the window size (10), which is 0.4 (computed as 4/10);

2) Rate of occurrence of the second terminal identifier $D_2$, "$Prior_2$" is calculated (block 1002) as a ratio of the number of occurrences of the second terminal identifier $D_2$ within the window to the window size (10), which is 0.3 (computed as 3/10);

3) Rate of occurrence of the third terminal identifier $D_3$, "$Prior_3$" is calculated (block 1004) as a ratio of the number of occurrences of the third terminal identifier $D_3$ within the window to the window size (10), which is 0.2 (computed as 2/10); and 4) Rate of occurrence of the fourth terminal identifier $D_4$, "$Prior_4$" is calculated (block 1006) as a ratio of the number of occurrences that the fourth terminal identifier $D_4$ within the window to the window size (10), which is 0.1 (computed as 1/10); and 5) A default rate for the newly received terminal identifier being a new not-before-seen ("unseen") computer terminal 100 is calculated (block 1008) as a ratio of one (for the single newly received unseen device) to the window size plus the one additional terminal signature tuple from the newly received unseen device, which is 0.09 (computed as 1/11).

More generally, for each of the sets, the posterior probability value is generated based on: computing a first occurrence rate based on a ratio of a sequence order of first occurrence of the terminal identifier of the set among content of the terminal signature tuples in the historical repository to a number of terminal signature tuples contained in the in the historical repository at a time of receipt of that first occurrence; computing a rate of occurrence based on a ratio of a number of occurrences of the terminal identifier of the set to a number of terminal signature tuples contained in the in the historical repository; and combining the first occurrence rate and the rate of occurrence to generate the posterior probability value for the set.

Figure 11:
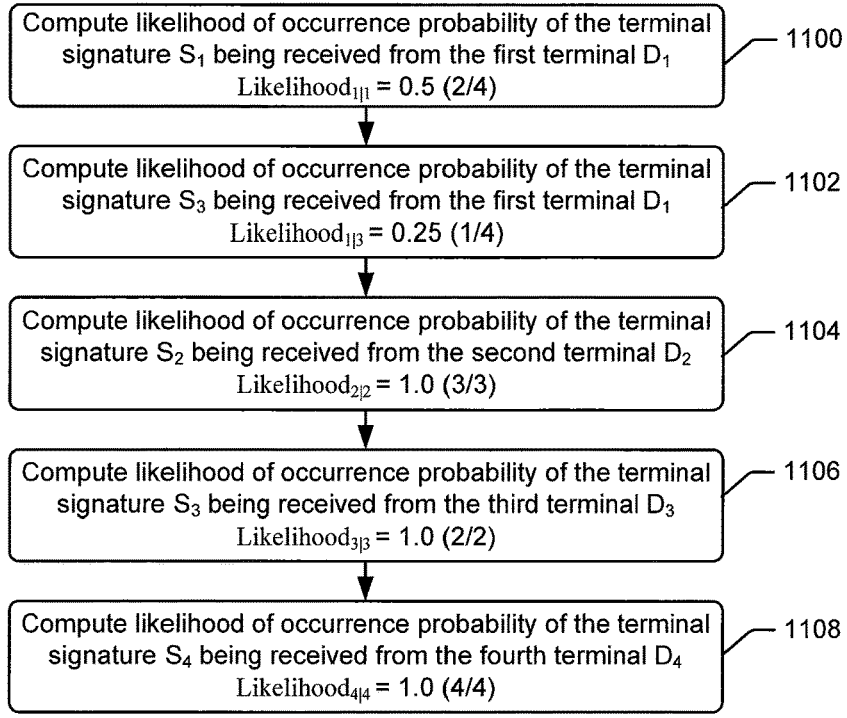

Referring to the flowchart of operations shown in FIG. 11, according to the example embodiment, likelihood of occurrence probabilities are generated for each unique terminal signature tuple, where the probabilities indicate a likelihood that the unique one of the terminal signature was received from one of the computer terminals 100 that provided the terminal signature tuples in the historical repository 142, based on the following operations:

1) Likelihood of occurrence probability of the terminal signature $S_1$ being received from the first device $D_1$, "$Likelihood_{1|1}$", is calculated (block 1100) as a ratio of the number of occurrences of that terminal signature $S_1$ to the number of terminal signature tuples received for device 1 (i.e., ($D_1$,$S_1$), ($D_1$,$S_1$), ($D_1$,$S_3$), ($D_1$,$S_3$)), which is 0.5 (computed as 2/4);

2) Likelihood of occurrence probability of the terminal signature $S_3$ being received from the first device $D_1$, "$Likelihood_{1|3}$", is calculated (block 1102) as a ratio of the number of occurrences of that terminal signature $S_3$ to the number of terminal signature tuples received for device 1 (i.e., ($D_1$,$S_1$), ($D_1$,$S_1$), ($D_1$,$S_3$), ($D_1$,$S_3$)), which is 0.25 (computed as 1/4);

3) Likelihood of occurrence probability of the terminal signature $S_2$ being received from the second device $D_2$, "$Likelihood_{2|2}$", is calculated (block 1104) as a ratio of the number of occurrences of that terminal signature $S_2$ to the number of terminal signature tuples received for device 2 (i.e., ($D_2$,$S_2$), ($D_2$,$S_2$), ($D_2$,$S_2$)), which is 1.0 (computed as 3/3);

4) Likelihood of occurrence probability of the terminal signature $S_3$ being received from the third device $D_3$, "$Likelihood_{3|3}$", is calculated (block 1106) as a ratio of the number of occurrences of that terminal signature $S_3$ to the number of terminal signature tuples received for device 3 (i.e., ($D_3$,$S_3$), ($D_3$,$S_3$)), which is 1.0 (computed as 2/2); and 5) Likelihood of occurrence probability of the terminal signature $S_4$ being received from the fourth device $D_4$, "$Likelihood_{4|4}$", is calculated (block 1108) as a ratio of the number of occurrences of that terminal signature $S_4$ to the number of terminal signature tuples received for device 4 (i.e.,($D_4$,$S_4$)), which is 1.0 (computed as 1/1).

Figure 12:
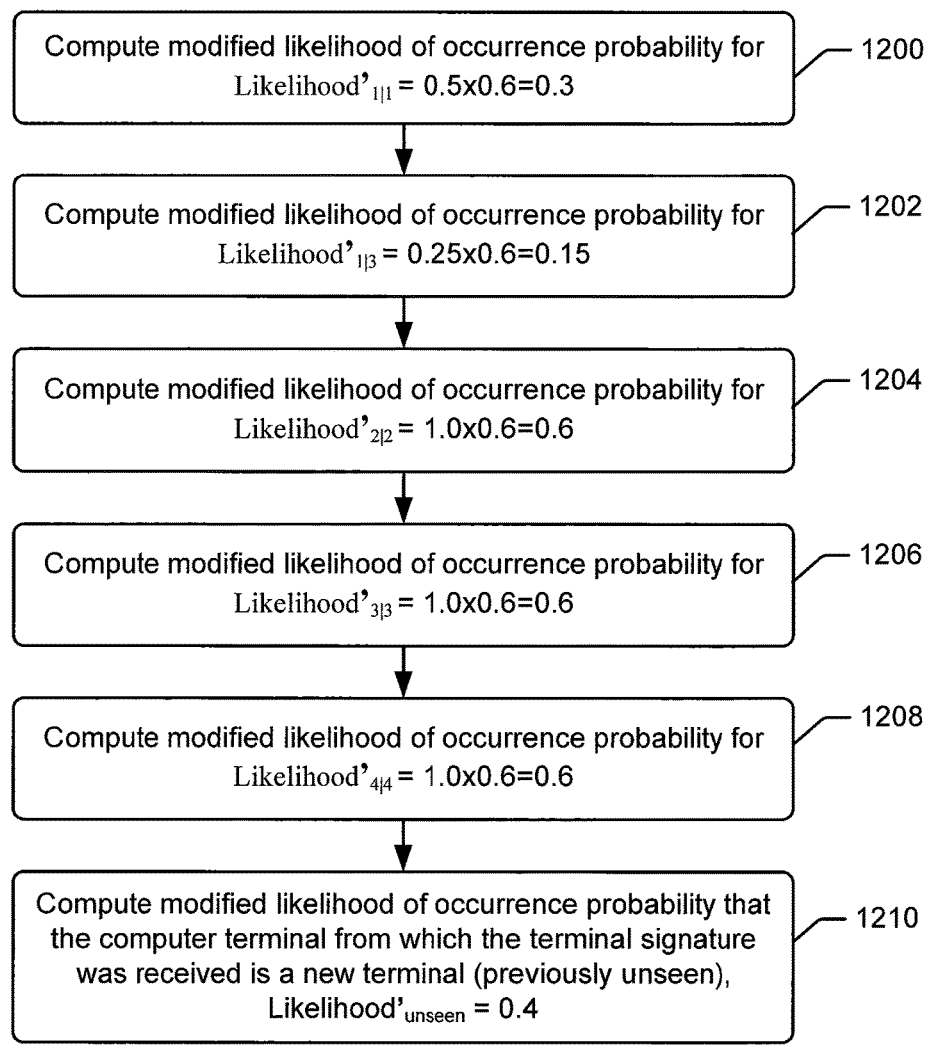

Referring to the flowchart of operations shown in FIG. 12, according to the example embodiment modified likelihood of occurrence probabilities are generated for each unique terminal signature tuple based on a product of the likelihood of occurrence probability and a result of one minus the ratio of number of unique terminal identifiers (4) over the window size (10 terminal signature tuples). In the present example, the probabilities is calculated based on the following operations:

1) Modified likelihood of occurrence probability $Likelihood'_{1|1}$, is calculated (block 1200) as 0.5 times 0.6 (i.e., 1−4/10), which is 0.3;

2) Modified likelihood of occurrence probability $Likelihood'_{1|3}$, is calculated (block 1202) as 0.25 times 0.6, which is 0.15;

3) Modified likelihood of occurrence probability Likelihood'$_{2|2}$, is calculated (block 1204) as 1.0 times 0.6, which is 0.6;

4) Modified likelihood of occurrence probability Likelihood'$_{3|3}$, is calculated (block 1206) as 1.0 times 0.6, which is 0.6;

5) Modified likelihood of occurrence probability Likelihood'$_{4|4}$, is calculated (block 1208) as 1.0 times 0.6, which is 0.6; and 6) Modified likelihood of occurrence probability that the computer terminal 100 from which the terminal signature was received is a new device (previously unseen) is calculated (block 1210) as Likelihood'$_{unseen}$, as 0.4 (ratio of number of different terminal identifiers (4) over the window size (10 terminal signature tuples).

Figure 13:
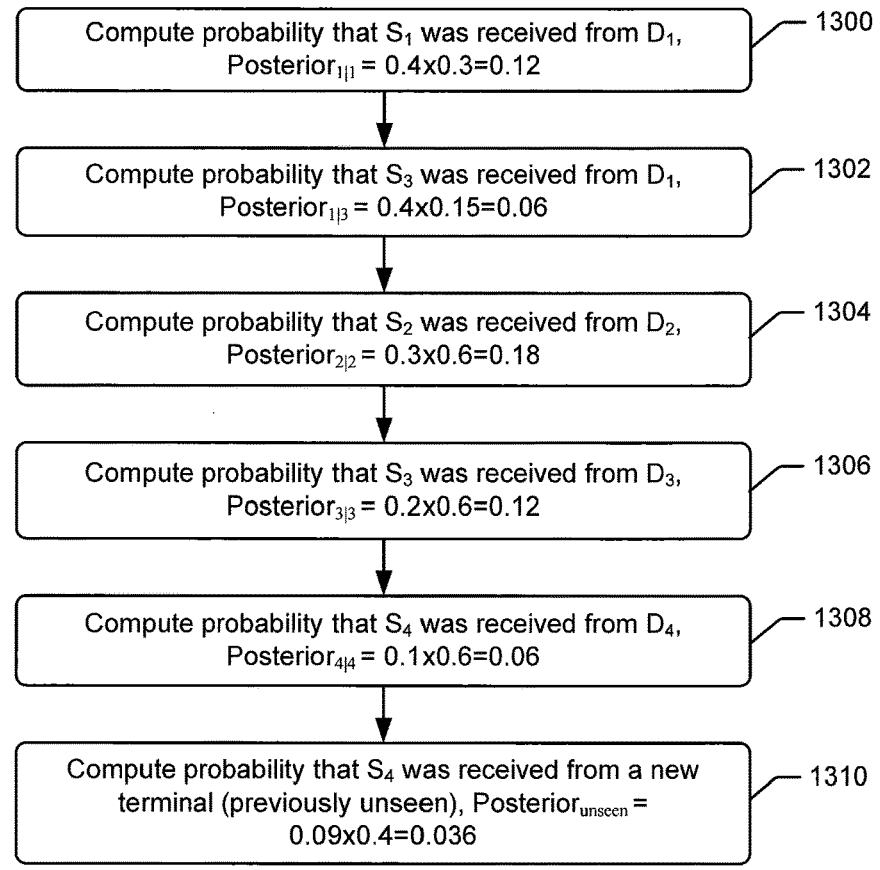

Referring to the flowchart of operations shown in FIG. 13, according to the example embodiment posteriors values, representing the probability that the received terminal signature was received from one of the four known devices, are computed for each of the unique terminal signature tuple, based on the following operations:

The probability that the terminal signature $S_1$ was received from the first computer terminal 100, Posterior$_{1|1}$, is computed (block 1300) as 0.4 times 0.3, which is 0.12;

The probability that the terminal signature $S_3$ was received from the first computer terminal 100, Posterior$_{1|3}$ is computed (block 1302) as 0.4 times 0.15, which is 0.06;

The probability that the terminal signature $S_2$ was received from the second computer terminal 100, Posterior$_{2|2}$ is computed (block 1304) as 0.3 times 0.6, which is 0.18;

The probability that the terminal signature $S_3$ was received from the third computer terminal 100, Posterior$_{3|3}$ is computed (block 1306) as 0.2 times 0.6, which is 0.12;

The probability that the terminal signature $S_4$ was received from the fourth computer terminal 100, Posterior$_{4|4}$ is computed (block 1308) as 0.1 times 0.6, which is 0.06; and The probability that the terminal signature was received from a new computer terminal 100 (previously unseen), "Posterior$_{unseen}$" is computed (block 1310) as 0.09 times 0.4, which is 0.036.

Based on results of the computations for the example embodiment, the terminal signature $S_3$ is more likely to have been received from a computer terminal 100 identified as $D_3$ in view of their posterior probability value of 0.12 for $D_3$ versus a posterior probability value of 0.05 for $D_1$, using a MAP rule ignoring the denominator. The actual probability values is 43.5% for the terminal 100 identified as $D_3$, and only 1.3% probability that the terminal signature $S_3$ was received from a computer terminal that was previously unseen (i.e., not $D_1$, $D_2$, $D_3$, or $D_4$) within the terminal signature tuples receive within the defined window size (i.e., 10).

As explained above, the content server 140 uses the probability value to control (block 808) whether access is granted for the access request containing the terminal signature tuple ($D_i$, $S_j$) from the computer terminal 100 to access a resource that is controlled by the content server 140.

In one embodiment, if the access request contains the terminal signature tuple ($D_1$, $S_3$), the posterior probability value of 0.12 for $D_3$ is greater than the posterior probability value of 0.036 that the terminal signature was received from a new computer terminal 100 (previously unseen), or in another embodiment greater than a threshold probability value. The content server 140 responsively grants access to the access request for the $D_3$ computer terminal 100 to access a resource, such as content (e.g., web page information, user account information, application data, etc.) which is controlled by the content server 140 and referenced by the access request (e.g., by a content identifier address therein). In contrast, if the access request contains another terminal signature tuple ($D_5$, $S_3$), the posterior probability value would be much closer to the than the posterior probability value of 0.036 that the terminal signature was received from a new computer terminal 100 (previously unseen), such as within a threshold range of the posterior probability value for a previously unseen terminal, or in another embodiment less than the threshold probability value. The content server 140 responsively denies access to the access request for the $D_5$ computer terminal 100 to access the resource controlled by the content server 140 and referenced by the access request, so that the $D_5$ computer terminal 100 is blocked from accessing the resource controlled by the content server 140. As explained above, the terminal identifier may be a MAC address contained in the access request from the source computer terminal.

In another embodiment, instead of denying access when the probability value does not satisfy a defined rule, the content server 140 restricts the type of information and/or the amount of information that is made accessible to the computer terminal 100. In one embodiment, the content server 140 associates different groupings of information (e.g., different levels of confidential information and/or different amounts of user information details) with different threshold levels of the probability value, and selectively makes only one of the information groupings available to the computer terminal 100 responsive to the determined probability value. One grouping of information may allow a user to view account summary information but not the underlying transactions information and preclude the user from making changes to any account information. Another grouping of information may allow a user to view account summary information and the underlying transactions information, but still preclude the user from making changes to any account information. Still another grouping of information may allow a user to view account summary information and the underlying transactions information, and allow the user to make changes to, the account information. The content server 140 can select among the different defined groupings of information based on which corresponding threshold values are satisfied by comparison to the probability value (e.g., where does the probability value within different ranges of values between the threshold values).

With continuing reference to FIGS. 8-13, the operations disclosed therein are now more generally explained. The posterior probability value is generated based on processing a combination of the terminal signature tuple contained in the access request message and the terminal signature tuples contained in the historical repository, by operations that can include: 1) grouping the terminal signature tuples contained in the historical repository into terminal signature tuple sets that each only contains terminal identifiers that are identical and terminal signatures that have at least a threshold level of similarity between them; 2) for each of the terminal signature tuple sets, generating a seen posterior probability value based on processing a combination of the terminal signature tuple set and the terminal signature tuple contained in the access request message so the seen posterior probability value indicates a likelihood that the terminal signature contained in the access request message occurs in the terminal signature tuple set with the same terminal identifier as contained in the access request message; and 3) generating an unseen posterior probability value based on processing a combination of the terminal signature tuple sets and the terminal signature tuple contained in the access request message so that the unseen posterior probability value indicates a likelihood that the terminal signature contained in the access request message does not occur among any of the terminal signature tuple sets with the same terminal identifier as contained in the access request message.

The operations for controlling whether access is granted for the access request message to access a resource controlled by the content server based on the posterior probability value, can include comparing the seen posterior probability values and the unseen posterior probability value, and controlling whether access is granted for the access request message to access the resource controlled by the content server based on the comparison.

The operations for controlling whether access is granted for the access request message to access the resource controlled by the content server based on the comparison, can include: granting access for the access request message to access the resource controlled by the content server responsive to the seen posterior probability values exceeding the unseen posterior probability value; and denying access for the access request message to access the resource controlled by the content server responsive to the unseen posterior probability values exceeding the seen posterior probability value.

The operations for controlling whether access is granted for the access request message to access the resource controlled by the content server based on the comparison, can alternatively include: granting access for the access request message to access the resource controlled by the content server responsive to the seen posterior probability values exceeding the unseen posterior probability value; and initiating communication of an authentication challenge to the source computer terminal responsive to the unseen posterior probability values exceeding the seen posterior probability value, and selectively granting access for the access request message to access the resource controlled by the content server responsive to content of an authentication response received from the source computer terminal.

The operations performed for each of the terminal signature tuple sets, to generate a seen posterior probability value, can include grouping the terminal signature tuples contained in the historical repository into common terminal sets that each only contains terminal identifiers that are identical, and for each of the common terminal sets, generating the seen posterior probability value based on: 1) computing a first occurrence rate based on a ratio of a sequence order of first occurrence of the terminal identifier of the common terminal set among content of the terminal signature tuples in the historical repository to a number of terminal signature tuples contained in the historical repository at a time of receipt of that first occurrence by the content server; 2) computing a prior rate of occurrence based on a ratio of a number of occurrences of the terminal identifier of the common terminal set to a total number of terminal signature tuples contained in the historical repository; and 3) generating the seen posterior probability value based on a combination of the first occurrence rate and the prior rate of occurrence.

The operations for generating the seen posterior probability value can include, for each of the terminal signature tuple sets, generating a likelihood of occurrence probability which indicates a likelihood that content of the terminal signature tuple set has the same terminal identifier as contained in the access request message and has a terminal signature having at least the threshold level of similarity to the terminal signature contained in the access request message.

The operations for generating the seen posterior probability value can further include: for each of the terminal signature tuple sets, generating a modified likelihood of occurrence probability based on a product of the likelihood of occurrence probability and a result of one minus a ratio of a number of the terminal signature tuple sets to a number of terminal signature tuples contained in the historical repository; and for each of the terminal signature tuple sets, generating the seen posterior probability values based on a product of the modified likelihood of occurrence probability generated for the terminal signature tuple set and the prior rate of occurrence computed for the common terminal set containing the terminal identifier of the terminal signature tuple sets.

Figure 14:
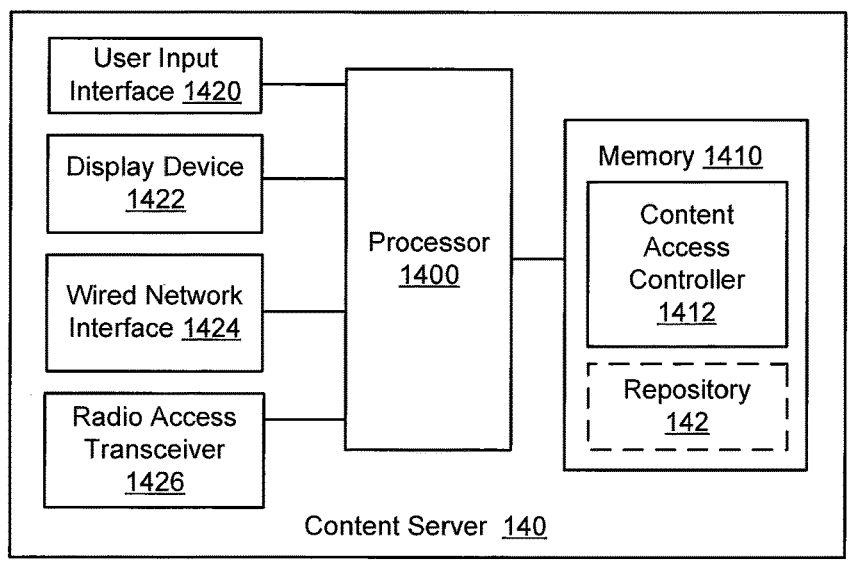
FIG. 14 is a block diagram of a content server configured according to some embodiments of the present disclosure.

FIG. 14 is a block diagram of a content server 140 configured according to some embodiments of the present disclosure. The content server 140 includes a processor 1400, a memory 1410, and a network interface circuit which may include a radio access transceiver 1426 and/or a wired network interface 1424 (e.g., Ethernet interface). The radio access transceiver 1426 can include, but is not limited to, a LTE or other cellular transceiver, WIFI transceiver (IEEE 802.11), Bluetooth, WiMax transceiver, or other radio communication transceiver configured to communicate with the computer terminal 100 via the radio access network 130.

The processor 1400 may include one or more data processing circuits, such as a general purpose and/or special purpose processor (e.g., microprocessor and/or digital signal processor) that may be collocated or distributed across one or more networks. The processor 1400 is configured to execute computer program code in the memory 1410, described below as a non-transitory computer readable medium, to perform at least some of the operations described herein as being performed by an application analysis computer. The computer program code may include a content access controller 1412 configured to control access by users and computer terminals 100 to content based on one or more of the embodiments disclosed herein. The memory 1410 may further include the repository 142 and may further include content that can be provided to computer terminals 100. The content can include, but is not limited to, application program code, digital video, digital audio, digital pictures, user information, webpage information, etc. The content server 140 may further include a user input interface 1420 (e.g., touch screen, keyboard, keypad, etc.) and a display device 1422.

Further Definitions and Embodiments:

In the above-description of various embodiments of the present disclosure, aspects of the present disclosure may be illustrated and described herein in any of a number of patentable classes or contexts including any new and useful process, machine, manufacture, or composition of matter, or any new and useful improvement thereof. Accordingly, aspects of the present disclosure may be implemented in entirely hardware, entirely software (including firmware, resident software, micro-code, etc.) or combining software and hardware implementation that may all generally be referred to herein as a "circuit," "module," "component," or "system." Furthermore, aspects of the present disclosure may take the form of a computer program product comprising one or more computer readable media having computer readable program code embodied thereon.

Any combination of one or more computer readable media may be used. The computer readable media may be a computer readable signal medium or a computer readable storage medium. A computer readable storage medium may be, for example, but not limited to, an electronic, magnetic, optical, electromagnetic, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), an appropriate optical fiber with a repeater, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable signal medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Scala, Smalltalk, Eiffel, JADE, Emerald, C++, C#, VB.NET, Python or the like, conventional procedural programming languages, such as the "C" programming language, Visual Basic, Fortran 2003, Perl, COBOL 2002, PHP, ABAP, dynamic programming languages such as Python, Ruby and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable instruction execution apparatus, create a mechanism for implementing the functions/acts specified in the flowchart and/or block diagram block or blocks.

These computer program instructions may also be stored in a computer readable medium that when executed can direct a computer, other programmable data processing apparatus, or other devices to function in a particular manner, such that the instructions when stored in the computer readable medium produce an article of manufacture including instructions which when executed, cause a computer to implement the function/act specified in the flowchart and/or block diagram block or blocks. The computer program instructions may also be loaded onto a computer, other programmable instruction execution apparatus, or other devices to cause a series of operational steps to be performed on the computer, other programmable apparatuses or other devices to produce a computer implemented process such that the instructions which execute on the computer or other programmable apparatus provide processes for implementing the functions/acts specified in the flowchart and/or block diagram block or blocks.

It is to be understood that the terminology used herein is for the purpose of describing particular embodiments only and is not intended to be limiting of the invention. Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of this specification and the relevant art and will not be interpreted in an idealized or overly formal sense expressly so defined herein.

The flowchart and block diagrams in the figures illustrate the architecture, functionality, and operation of possible implementations of systems, methods, and computer program products according to various aspects of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular aspects only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Like reference numbers signify like elements throughout the description of the figures.

The corresponding structures, materials, acts, and equivalents of any means or step plus function elements in the claims below are intended to include any disclosed structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The aspects of the disclosure herein were chosen and described in order to best explain the principles of the disclosure and the practical application, and to enable others of ordinary skill in the art to understand the disclosure with various modifications as are suited to the particular use contemplated.

The invention claimed is:

1. A method of performing operations on a processor of a content server, the method comprising:
   maintaining in a memory device a historical repository of terminal signature tuples received from a plurality of computer terminals, each of the terminal signature tuples containing a terminal identifier for a computer terminal and a terminal signature characterizing a measured operation by the computer terminal;
   receiving an access request message through a network interface circuit from a source computer terminal, the access request message containing a terminal signature tuple, the terminal signature tuple in the access request message containing a terminal identifier for the source computer terminal and a terminal signature characterizing a measured operation by the source computer terminal;
   generating a posterior probability value based on processing a combination of the terminal signature tuple contained in the access request message and the terminal signature tuples contained in the historical repository; and
   controlling whether access is granted for the access request message to access a resource controlled by the content server based on the posterior probability value,
   wherein:
   the generating a posterior probability value based on processing a combination of the terminal signature tuple contained in the access request message and the terminal signature tuples contained in the historical repository, comprises:
      grouping the terminal signature tuples contained in the historical repository into terminal signature tuple sets that each only contains terminal identifiers that are identical and terminal signatures that have at least a threshold level of similarity between them;
      for each of the terminal signature tuple sets, generating a seen posterior probability value based on processing a combination of the terminal signature tuple set and the terminal signature tuple contained in the access request message so the seen posterior probability value indicates a likelihood that the terminal signature contained in the access request message occurs in the terminal signature tuple set with the same terminal identifier as contained in the access request message; and
      generating an unseen posterior probability value based on processing a combination of the terminal signature tuple sets and the terminal signature tuple contained in the access request message so that the unseen posterior probability value indicates a likelihood that the terminal signature contained in the access request message does not occur among any of the terminal signature tuple sets with the same terminal identifier as contained in the access request message;
   the controlling whether access is granted for the access request message to access a resource controlled by the content server based on the posterior probability value, comprises:
      comparing the seen posterior probability values and the unseen posterior probability value; and
      controlling whether access is granted for the access request message to access the resource controlled by the content server based on the comparison.

2. The method of claim 1, wherein the controlling whether access is granted for the access request message to access the resource controlled by the content server based on the comparison, comprises:
   granting access for the access request message to access the resource controlled by the content server responsive to the seen posterior probability values exceeding the unseen posterior probability value; and
   denying access for the access request message to access the resource controlled by the content server responsive to the unseen posterior probability values exceeding the seen posterior probability value.

3. The method of claim 1, wherein the controlling whether access is granted for the access request message to access the resource controlled by the content server based on the comparison, comprises:
   granting access for the access request message to access the resource controlled by the content server responsive to the seen posterior probability values exceeding the unseen posterior probability value; and
   initiating communication of an authentication challenge to the source computer terminal responsive to the unseen posterior probability values exceeding the seen posterior probability value, and selectively granting access for the access request message to access the resource controlled by the content server responsive to content of an authentication response received from the source computer terminal.

4. The method of claim 1, wherein the for each of the terminal signature tuple sets, generating a seen posterior probability value based on processing a combination of the terminal signature tuple set and the terminal signature tuple contained in the access request message so the seen posterior probability value indicates a likelihood that the terminal signature contained in the access request message occurs in the terminal signature tuple set with the same terminal identifier as contained in the access request message, comprises:
   grouping the terminal signature tuples contained in the historical repository into common terminal sets that each only contains terminal identifiers that are identical;
   for each of the common terminal sets, generating the seen posterior probability value based on:
      computing a first occurrence rate based on a ratio of a sequence order of first occurrence of the terminal identifier of the common terminal set among content of the terminal signature tuples in the historical repository to a number of terminal signature tuples contained in the historical repository at a time of receipt of that first occurrence by the content server;

computing a prior rate of occurrence based on a ratio of a number of occurrences of the terminal identifier of the common terminal set to a total number of terminal signature tuples contained in the historical repository; and generating the seen posterior probability value based on a combination of the first occurrence rate and the prior rate of occurrence.

5. The method of claim 4, wherein generation of the seen posterior probability value further comprises:

for each of the terminal signature tuple sets, generating a likelihood of occurrence probability which indicates a likelihood that content of the terminal signature tuple set has the same terminal identifier as contained in the access request message and has a terminal signature having at least the threshold level of similarity to the terminal signature contained in the access request message.

6. The method of claim 5, wherein generation of the seen posterior probability value further comprises:

for each of the terminal signature tuple sets, generating a modified likelihood of occurrence probability based on a product of the likelihood of occurrence probability and a result of one minus a ratio of a number of the terminal signature tuple sets to a number of terminal signature tuples contained in the historical repository; and for each of the terminal signature tuple sets, generating the seen posterior probability values based on a product of the modified likelihood of occurrence probability generated for the terminal signature tuple set and the prior rate of occurrence computed for the common terminal set containing the terminal identifier of the terminal signature tuple sets.

7. The method of claim 1, wherein:

each of the terminal signatures of the terminal signature tuples comprises a hierarchical cache latency signature vector that contains associated pairs of elapsed times and buffer sizes, the elapsed times indicating how long a processor of the computer terminal took to read data from buffer addresses, which include upper and lower boundaries of each of the buffer sizes, of buffers sequentially allocated in a hierarchical memory structure comprising a plurality of levels of cache memories that hierarchically cache data that is read by the processor from a main memory; and the grouping the terminal signature tuples contained in the historical repository into terminal signature tuple sets that each only contains terminal identifiers that are identical and terminal signatures that have at least a threshold level of similarity between them, comprises:

grouping the terminal signature tuples contained in the historical repository into the terminal signature tuple sets, based on for each of the terminal signature tuple sets grouping the terminal signature tuples contained in the historical repository into the terminal signature tuple set that only contains hierarchical cache latency signature vectors that have at least the threshold level of similarity between them.

8. The method of claim 7, wherein:

the grouping the terminal signature tuples contained in the historical repository into the terminal signature tuple sets, based on for each of the terminal signature tuple sets grouping the terminal signature tuples contained in the historical repository into the terminal signature tuple set that only contains hierarchical cache latency signature vectors that have at least the threshold level of similarity between them, comprises:

comparing similarity of a numerical trend through the associated pairs of the elapsed times and the buffer sizes in each of the hierarchical cache latency signature vectors of the terminal signature tuples contained in the historical repository.

9. The method of claim 8, wherein the comparing similarity of a numerical trend through the associated pairs of the elapsed times and the buffer sizes in each of the hierarchical cache latency signature vectors of the terminal signature tuples contained in the historical repository, comprises:

identifying locations, where slopes in the numerical trend through the associated pairs of the elapsed times and the buffer sizes change by a threshold value, occur in each of the hierarchical cache latency signature vectors of the terminal signature tuples contained in the historical repository; and grouping the terminal signature tuples contained in the historical repository into the terminal signature tuple set have locations that are identified are within a threshold distance of other terminal signature tuples in the terminal signature tuple set.

10. The method of claim 1, wherein:

each of the terminal signatures of the terminal signature tuples comprises an operation system (OS) speed scaling gain used by an OS of the computer terminal to transform mouse movement data into mouse speed data that controls positioning by the computer terminal of a mouse pointer relative to pixel locations on a display device; and the grouping the terminal signature tuples contained in the historical repository into terminal signature tuple sets that each only contains terminal identifiers that are identical and terminal signatures that have at least a threshold level of similarity between them, comprises:

grouping the terminal signature tuples contained in the historical repository into the terminal signature tuple sets, based on for each of the terminal signature tuple sets grouping the terminal signature tuples contained in the historical repository into the terminal signature tuple set that only contains OS speed scaling gains that are within a threshold range between them.

11. The method of claim 1, wherein:

each of the terminal signatures of the terminal signature tuples comprises an elapsed time metric indicating how long a processor of the computer terminal took to complete execution of a defined set of operations; and the grouping the terminal signature tuples contained in the historical repository into terminal signature tuple sets that each only contains terminal identifiers that are identical and terminal signatures that have at least a threshold level of similarity between them, comprises:

grouping the terminal signature tuples contained in the historical repository into the terminal signature tuple sets, based on for each of the terminal signature tuple sets grouping the terminal signature tuples contained in the historical repository into the terminal signature tuple set that only contains elapsed time metrics that are within a threshold range between them.

12. The method of claim 1, wherein:

each of the terminal signatures of the terminal signature tuples comprises a number of failed memory bytes in a memory of the computer terminal; and the grouping the terminal signature tuples contained in the historical repository into terminal signature tuple sets that each only contains terminal identifiers that are identical and terminal signatures that have at least a threshold level of similarity between them, comprises:
grouping the terminal signature tuples contained in the historical repository into the terminal signature tuple sets, based on for each of the terminal signature tuple sets grouping the terminal signature tuples contained in the historical repository into the terminal signature tuple set that only contains numbers of failed memory bytes that are within a threshold range between them.

13. The method of claim 1, wherein:
each of the terminal signatures of the terminal signature tuples comprises an elapsed time metric indicating an elapsed time between the computer terminal communicating a ping request to a network server and receiving a ping response from the network server; and
the grouping the terminal signature tuples contained in the historical repository into terminal signature tuple sets that each only contains terminal identifiers that are identical and terminal signatures that have at least a threshold level of similarity between them, comprises:
grouping the terminal signature tuples contained in the historical repository into the terminal signature tuple sets, based on for each of the terminal signature tuple sets grouping the terminal signature tuples contained in the historical repository into the terminal signature tuple set that only contains elapsed time metrics that are within a threshold range between them.

14. The method of claim 1, wherein:
each of the terminal signatures of the terminal signature tuples comprises a list of terminal identifiers that are detected by a transceiver of the computer terminal; and
the grouping the terminal signature tuples contained in the historical repository into terminal signature tuple sets that each only contains terminal identifiers that are identical and terminal signatures that have at least a threshold level of similarity between them, comprises:
grouping the terminal signature tuples contained in the historical repository into the terminal signature tuple sets, based on for each of the terminal signature tuple sets grouping the terminal signature tuples contained in the historical repository into the terminal signature tuple set that only contains lists of terminal identifiers that have a threshold level of similarity between them.

15. A content server comprising:
a network interface circuit configured to communicate with computer terminals;
a processor circuit coupled to the network interface; and
a memory circuit coupled to the processor circuit and storing program code which when executed by the processor circuit causes the processor circuit to perform operations comprising:
maintaining in the memory circuit a historical repository of terminal signature tuples received from a plurality of the computer terminals, each of the terminal signature tuples containing a terminal identifier for a computer terminal and a terminal signature characterizing a measured operation by the computer terminal;
receiving an access request message through the network interface circuit from a source computer terminal, the access request message containing a terminal signature tuple, the terminal signature tuple in the access request message containing a terminal identifier for the source computer terminal and a terminal signature characterizing a measured operation by the source computer terminal;
generating a posterior probability value based on processing a combination of the terminal signature tuple contained in the access request message and the terminal signature tuples contained in the historical repository; and
controlling whether access is granted for the access request message to access a resource controlled by the content server based on the posterior probability value,
wherein:
the generating a posterior probability value based on processing a combination of the terminal signature tuple contained in the access request message and the terminal signature tuples contained in the historical repository, comprises:
grouping the terminal signature tuples contained in the historical repository into terminal signature tuple sets that each only contains terminal identifiers that are identical and terminal signatures that have at least a threshold level of similarity between them;
for each of the terminal signature tuple sets, generating a seen posterior probability value based on processing a combination of the terminal signature tuple set and the terminal signature tuple contained in the access request message so the seen posterior probability value indicates a likelihood that the terminal signature contained in the access request message occurs in the terminal signature tuple set with the same terminal identifier as contained in the access request message; and
generating an unseen posterior probability value based on processing a combination of the terminal signature tuple sets and the terminal signature tuple contained in the access request message so that the unseen posterior probability value indicates a likelihood that the terminal signature contained in the access request message does not occur among any of the terminal signature tuple sets with the same terminal identifier as contained in the access request message,
the controlling whether access is granted for the access request message to access a resource controlled by the content server based on the posterior probability value, comprises:
comparing the seen posterior probability values and the unseen posterior probability value; and
controlling whether access is granted for the access request message to access the resource controlled by the content server based on the comparison.

16. The content server of claim 15, wherein the for each of the terminal signature tuple sets, generating a seen posterior probability value based on processing a combination of the terminal signature tuple set and the terminal signature tuple contained in the access request message so the seen posterior probability value indicates a likelihood that the terminal signature contained in the access request message occurs in the terminal signature tuple set with the same terminal identifier as contained in the access request message, comprises:
grouping the terminal signature tuples contained in the historical repository into common terminal sets that each only contains terminal identifiers that are identical;
for each of the common terminal sets, generating the seen posterior probability value based on:

computing a first occurrence rate based on a ratio of a sequence order of first occurrence of the terminal identifier of the common terminal set among content of the terminal signature tuples in the historical repository to a number of terminal signature tuples contained in the historical repository at a time of receipt of that first occurrence by the content server;

computing a prior rate of occurrence based on a ratio of a number of occurrences of the terminal identifier of the common terminal set to a total number of terminal signature tuples contained in the historical repository; and generating the seen posterior probability value based on a combination of the first occurrence rate and the prior rate of occurrence.

17. The content server of claim 16, wherein generation of the seen posterior probability value further comprises:

for each of the terminal signature tuple sets, generating a likelihood of occurrence probability which indicates a likelihood that content of the terminal signature tuple set has the same terminal identifier as contained in the access request message and has a terminal signature having at least the threshold level of similarity to the terminal signature contained in the access request message.

18. The content server of claim 17, wherein generation of the seen posterior probability value further comprises:

for each of the terminal signature tuple sets, generating a modified likelihood of occurrence probability based on a product of the likelihood of occurrence probability and a result of one minus a ratio of a number of the terminal signature tuple sets to a number of terminal signature tuples contained in the historical repository; and for each of the terminal signature tuple sets, generating the seen posterior probability values based on a product of the modified likelihood of occurrence probability generated for the terminal signature tuple set and the prior rate of occurrence computed for the common terminal set containing the terminal identifier of the terminal signature tuple sets.

19. The content server of claim 15, wherein:

each of the terminal signatures of the terminal signature tuples comprises a hierarchical cache latency signature vector that contains associated pairs of elapsed times and buffer sizes, the elapsed times indicating how long a processor of the computer terminal took to read data from buffer addresses, which include upper and lower boundaries of each of the buffer sizes, of buffers sequentially allocated in a hierarchical memory structure comprising a plurality of levels of cache memories that hierarchically cache data that is read by the processor from a main memory; and the grouping the terminal signature tuples contained in the historical repository into terminal signature tuple sets that each only contains terminal identifiers that are identical and terminal signatures that have at least a threshold level of similarity between them, comprises:

grouping the terminal signature tuples contained in the historical repository into the terminal signature tuple sets, based on for each of the terminal signature tuple sets grouping the terminal signature tuples contained in the historical repository into the terminal signature tuple set that only contains hierarchical cache latency signature vectors that have at least the threshold level of similarity between them.

* * * * *